United States Patent [19]

Ootsuka et al.

[11] Patent Number: 4,862,206
[45] Date of Patent: Aug. 29, 1989

[54] EXPOSURE CONTROL SYSTEM

[75] Inventors: Hiroshi Ootsuka, Sakai; Shinji Tominaga, Chihayaakasaka; Haruo Kobayashi, Sakai; Shuzo Matsushita, Ikeda; Takeo Hoda; Hiromu Mukai, both of Kawachinagano, all of Japan

[73] Assignee: Minolta Camera Kabushiki Kaisha, Osaka, Japan

[21] Appl. No.: 186,756

[22] Filed: Apr. 26, 1988

Related U.S. Application Data

[63] Continuation of Ser. No. 89,924, Aug. 25, 1987, abandoned, which is a continuation of Ser. No. 878,844, filed as PCT JP85/00567 on Oct. 12, 1985, abandoned.

[30] Foreign Application Priority Data

Oct. 12, 1984 [JP] Japan .................................. 59-214788
Apr. 5, 1985 [JP] Japan .................................. 60-73358
Apr. 5, 1985 [JP] Japan .................................. 60-73359
Apr. 5, 1985 [JP] Japan .................................. 60-73360
Apr. 5, 1985 [JP] Japan .................................. 60-73361

[51] Int. Cl.$^4$ ........................ G03B 15/05; G03B 7/08; G01J 1/42
[52] U.S. Cl. .................... 354/414; 354/418; 354/419; 354/420; 354/432; 356/222; 356/221
[58] Field of Search ................ 354/414-424, 354/429, 431-440, 430; 356/221, 222

[56] References Cited

U.S. PATENT DOCUMENTS 4,690,536  9/1987  Nakai et al. ................. 354/414 X
4,705,382  11/1907  Mukai et al. ................ 354/416 X
4,746,947  5/1988  Nakai .......................... 354/416 X
4,748,468  5/1988  Fujino et al. ................ 354/432 X Primary Examiner—W. B. Perkey
Attorney, Agent, or Firm—Burns, Doane, Swecker & Mathis

[57] ABSTRACT

A contralight compensation exposure control system which determines as a contralight condition and fires a strobe when there is a difference between the output of a partial light measuring means for measuring the brightness of a portion of a scene to be photographed i.e. the brightness of the main object such as a person, and the output of an average light measuring means for measuring the brightness of comparatively large area of the scene i.e. the brightness of the subordinate object such as the background of the main object. The control circuit of the system inhibits the strobe firing and actuates an exposure compensation means to shift the controlled exposure to the overexposure side when a detecting means detect uncompletion of charging of the main capacitor for firing the strobe even if the contralight condition is detected.

9 Claims, 15 Drawing Sheets

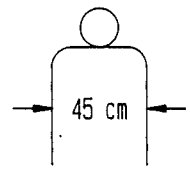
FIG. 7-(1)
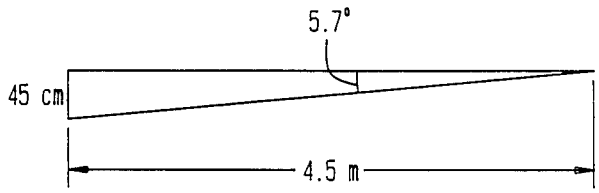
FIG. 7-(2)
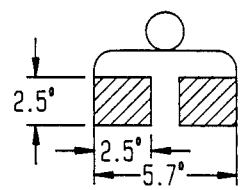
FIG. 7-(3)
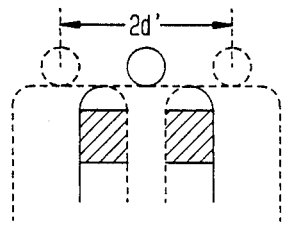
FIG. 7-(4)
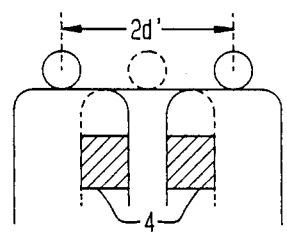
FIG. 8

FIG. 9
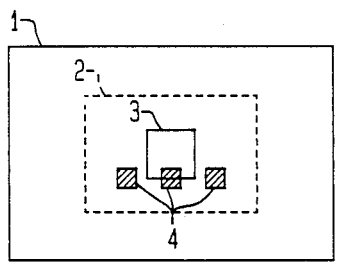
FIG. 10
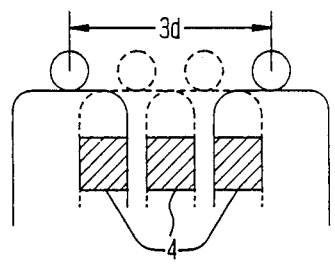
FIG. 11-(1)
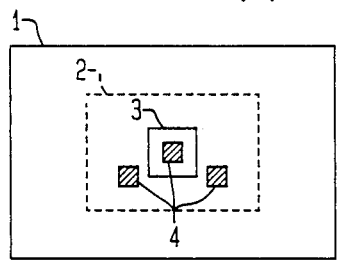
FIG. 11-(2)
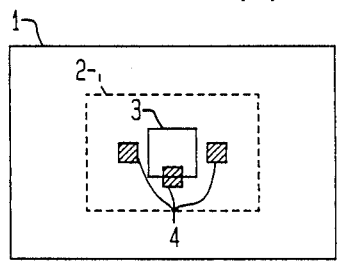
FIG. 12-(1)
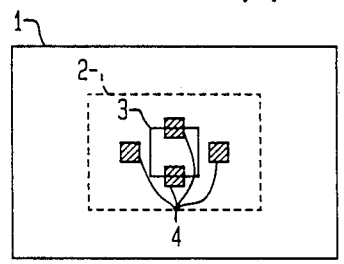
FIG. 12-(2)
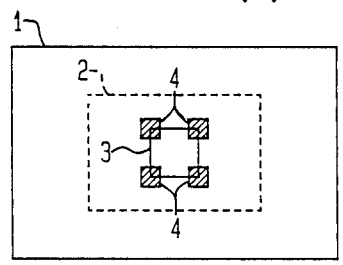
FIG. 13
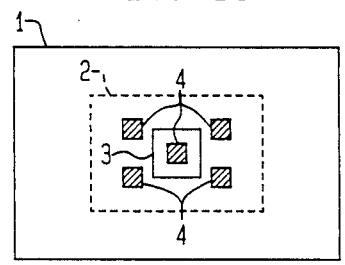

EXPOSURE CONTROL SYSTEM

This application is a continuation, of application Ser. No. 089,924, filed Aug. 25, 1987, which is a continuation of application Ser. No. 878,844, filed as PCT JP85/00567 on Oct. 12, 1985, both abandoned.

FIELD OF THE INVENTION

The present invention relates to an exposure control system for a camera which is detachably coupled with or incorporates an electronic flash device, i.e. a strobe, and in particular it pertains to an exposure control system which provides proper exposure to both a main object and its background in contralight condition, i.e. when the background has higher brightness than the main object.

BACKGROUND OF THE INVENTION

A Japanese laid-open patent application with a laid-open No. Sho 48-94429 proposed a device which automatically switches an exposure control device to a flash photography condition, determining, a condition notwithstanding the brightness level of the scene, when a difference larger than a given value exists between the brightness of a portion of a scene to be photographed such as the brightness of a main object and the average or integrated brightness of the scene or the brightness of the background.

The device disclosed in the Japanese laid-open patent application of the laid-open No. Sho 48-94429 determines a contralight condition when a difference larger than a given value exists between the brightness of a main object, and the brightness of the background. The device then fires a strobe to compensate for the difference of the brightness. However, the device is switched to a flash photography condition to effect photography with a strobe being used even when a camera shutter is released with the charging in the strobe being incomplete, i.e. before the main capacitor for energizing the flash tube is charged to a required level. If the shutter is released with the charging of the main capacitor being incomplete, the strobe is not fired or a sufficient amount of flash light emission is not provided so that a desired result is not obtained. If a release lock device is added to the above mentioned prior art device to disable the photography until the main capacitor for energizing the flash tube is charged, the the result expected from the device will be attained. However, it generally takes time for the main capacitor to be charged to a required level, and it is likely that a shutter chance is lost. Additionally, it is of no use to fire the strobe even in the contralight condition if the object to be photographed is so far away from the camera that a sufficient amount of flash light can not reach the object.

DESCRIPTION OF THE INVENTION

An object of the present invention is to provide an improved exposure control system which provides suitable exposure to both a main and subordinate objects under a contralight condition.

Another object of the present invention is to provide an exposure control system which provides a suitable exposure to a main object when a contralight condition of a scene to be photographed is detected and the camera shutter is released before a strobe becomes ready for firing.

Still another object of the present invention is to provide an exposure control system which prevents useless light emission of the strobe when the contralight condition is detected but the object to be photographed is too far from the camera for the flash light to reach the object.

According to one aspect of the present invention, a camera which effects flash firing to compensate for a contralight when the camera detects the contralight condition. When, upon flash firing in accordance with the detection of the contralight condition, it is detected that the charged voltage of the main capacitor for energizing the flash tube has not reached a desired level, the camera shifts the amount of exposure to a value for providing an over exposure, i.e. increases the amount of exposure such that a proper exposure is given for the main object without flash light. Additionally, the user need not wait until the main capacitor for energizing the flash tube is charged to a required level and he or she will not lose a shutter chance Further, the camera enforcedly prevents flash light emission when the amount of exposure is shifted to an over exposure providing value, it is not likely to occur that an over exposure is provided for the main object.

According to another aspect of the invention, the camera which fires a strobe to compensate for a contralight when the latter condition is detected, is provided with a distance detector which detects the distance from the camera to an object to be photographed (hereinafter referred to as an object distance). At that time the camera determines that the flash light will not contribute to the exposure, and prevents the flash firing to save the useless consumption of the power source battery when the signal from the distance detector indicates a too long distance, even if contralight detector detects a contralight condition.

According to an embodiment of the present invention, the contralight detecting means includes a partial light measuring means which measures the brightness of a small portion of the scene to be photographed, an average light measuring means which measures the average brightness of the comparatively large area of the scene, and a determination means which compares the brightness measured by the two light measuring means and determines as a contralight condition when the partial brightness is lower than the average brightness by an amount larger than a given value. The partial light measuring means is ar to measure the portion of the scene which is horizontally central and a little down from the vertical center. With this arrangement, the possibility that the partial light measuring means measures an outside of the main object is less and the contralight condition is detected at high accuracy.

According to the embodiment of the invention, the partial light measuring means for the contralight measuring means is arranged to measure a plurality of portions of the scene with the interval between adjacent measured portions being determined on the basis of the width of the shoulder or body of a person standing at a given distance from the camera and having a standard figure. As the result, the possibility of the brightness of the main object being measured is high and the contralight condition is detected with high reliability Further, the embodiment of the present invention provided with a diaphragm shutter which gradually opens at a given speed and is closed when the opening reaches a value that provides a desired exposure When a contralight condition is detected, the time of the diaphragm shutter closure is determined in compliance with the average light measurement and the strobe is fired upon arrival of the opening of the diaphragm shutter to a value that corresponds to a diaphragm aperture value determined as a function of the guide number of the strobe and the camera-to-object distance. In the case when sufficient compensation for contralight is not expected even if the strobe is fired just before the diaphragm shutter starts to close, the exposure value for controlling the time of the initiation of the diaphragm shutter closure is shifted to the under-exposure side with the strobe being fired just before the diaphragm shutter begins to close with this operation, the difference of brightness between the main and subordinate objects is less in the resultant picture which shows a balanced exposure.

The above and other objects and features of the present invention will become more apparent when the following detailed description of the preferred embodiment is read with reference to the annexed drawings. However, it should be noted that the drawings are for the purpose of explanation but not for limiting the scope of the invention.

BRIEF DESCRIPTION OF THE DRAWINGS

FIGS. 7 (1) through (4) are illustrations for explaining, by numerical examples, the light measurable range for the person to be photographed in the case brightness is measured at two portions wherein FIG. 7 (1) shows the width of the shoulder of an average person, Figure 7 (2) shows how to measure the angle of light measurement for the width of the shoulder of a person standing at a distance of 4.5 m, FIG. 7 (3) shows a light measuring areas covered by the light measuring angle of 2.5° in relation with the shoulder width of a person to be photographed, and FIG. 7 (4) shows light measurable area for the person;

FIG. 8 is an explanatory illustration of the light measurable area for the person illustrated in FIG. 4;

FIG. 9 is an illustration of light measuring area having the average and partial light measuring areas of FIG. 3;

FIG. 10 is an explanatory illustration of light measurable area for the person shown in FIG. 9;

FIG. 11 (1) and (2) are illustrations of light measuring areas as modification of the light measuring area shown in FIG. 9;

FIGS. 12 (1) and (2) are illustrations of light measuring areas showing a fourth example of the average and partial light measuring areas;

FIG. 13 is another illustration of a fifth example of the average and partial light measuring areas;

THE BEST MODE TO EMBODY THE INVENTION

Figure 1:
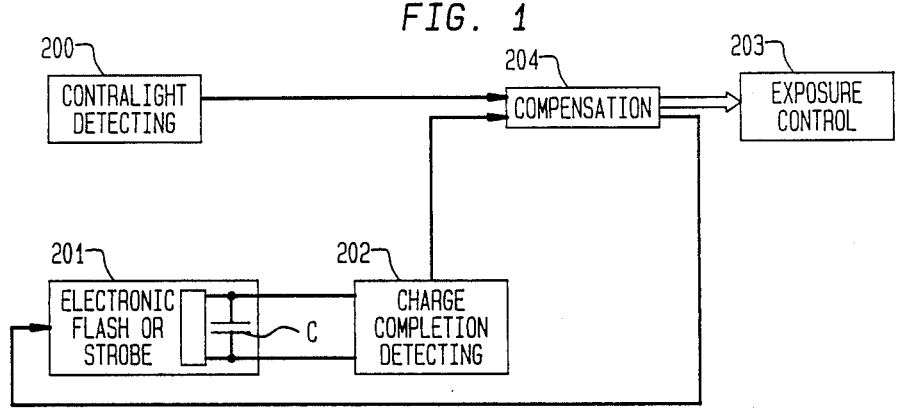
FIG. 1 is a schematic view illustrating an exemplary construction of the present invention.

FIG. 1 shows a basic construction of the present invention which comprises a contralight detecting means 200 for detecting contralight condition, an electronic flash or strobe means 201 including a main capacitor, an exposure control means 203 for controlling camera exposure and a compensation means 204 for enabling strobe firing when the main capacitor has been charged with contralight condition being detected, and for inhibiting the strobe firing and compensating the exposure when the main capacitor has not been charged.

With this construction, when a charge completion detecting means 202 detects charge completion of the main capacitor C in the strobe means 201 with the contralight detecting means 200 detecting contralight condition, the compensation means 204 receiving signals respectively representing the charging condition of the main capacitor C and the condition of the contralight, outputs a light emission enabling signal 201 to the strobe means. When contralight condition is detected and incompletion of the charging of the main capacitor C is also detected, the compensation means 204 outputs a light emission inhibiting signal to the strobe means 201 and output to the control circuit a signal for compensating exposure.

For the detection of the contralight condition, a partial light measuring means and an average light measuring means are used as described above. In the following, explanation will first be made about the determination of the light measuring area in the scene to be photographed, for effectively catching the main object to detect the contralight condition with higher reliability.

Figure 2:
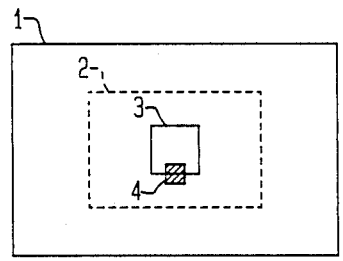
FIG. 2 is an illustration of a first example of the average and partial light measuring areas.

FIG. 2 shows a case wherein a single light measuring element is employed for the partial light measurement. The reference numeral 1 denotes the scene to be photographed. The numeral 2 denotes the area measured by the average light measuring element, while the numeral 3 denotes the area for which the camera-to-object distance is measured. The partial light measuring element measures the brightness of the area 4.

When a single light measuring element is employed for the partial light measurement, the portion to be measured is located at the center in the horizontal direction and a little downward from the center in the vertical direction. The light measuring area is at the center with respect to the horizontal direction, because it is most likely that a person to be photographed is, at the center of the scene with respect to the horizontal direction. Especially, in the case of a camera which has an indication of a distance measuring area (the area for which the camera-to-object distance is measured or determined) in the viewfinder field, it is common that the distance measuring area is indicated at the center of the viewfinder field. Accordingly, the possibility of the person to be photographed being at the center is higher. If the camera has an AF-lock device which memorizes the result of automatic distance or focus detection, the camera may also have an AE lock mechanism that memorizes the result of light measurement. Then, the brightness of the object as well as its distance is measured correctly even at the time of freeze photography wherein a picture is taken with the focusing and the exposure being determined in accordance with the values memorized in advance of the photography operation.

The light measuring area for the partial light measuring element is a little down from the center with respect to vertical direction in order to catch with higher possibility the person to be photographed as the main object. In more detail, when the light measuring area of the light measuring element is adapted to measured the face of the person to be photographed, the face will be small relative to the scene as the distance from the camera to the person is larger so that the light measuring area is larger than the face. In other words, the light receiving element measure the brightness not only the face but also of the portion other than the face. A light receiving element is generally affected by high brightness portion. Accordingly, when the face has lower brightness in comparison with the remaining portion within the light measuring area, the output of the light receiving element relies on the brightness of the remaining portion and a light measurement output corresponding to the brightness of the face is not obtained, although the effect of the remaining portion relies on the area occupied by the face in the light measuring area. In addition, when the face is offset from the center, it is likely to occur that the face, which is relatively small, is out of the light measuring range and correct exposure is not provided for the person. In contrast, if the light measurement is made for the body of the person, it is less likely to occur that the light measuring area mismatches the main object. For that reason, the light measuring area is determined on the basis, of the width of a human body, e.g. the width of shoulders. In consideration of the common location of the body of the person to be photographed, the light measuring area for the light receiving element is set down from the center However, if the light measuring area is displaced too much downward from the center, the light measuring area is to measure the right or left side portion of the scene and can not measure the person as the main object in the case of picture taking in vertical position.

Figure 3:
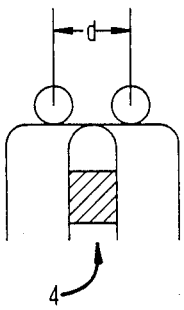
FIG. 3 is an explanatory illustration showing the light measurable range for the person shown in FIG. 2.

FIG. 3 shows a light measurable range of a partial light measuring element for a person at a maximum measurable distance, e.g. the maximum finite distance that can be measured by the distance detecting device, the measurable range being indicated by a range mark 4. As seen from the Figure, the light measuring area 4 for the partial light measuring element is fully included within the area of the body of the subject person such that the brightness of the body is accurately measured. In such a light measuring system, the light measurement is available while the subject people do not move beyond the distance d which is measured between the centers of the face of the subject person at the right- and left-hand limit.

Figure 4:
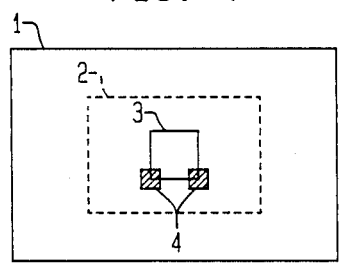
FIG. 4 is illustration of a second example of the average and partial light measuring area.

FIG. 4 shows light measuring areas in the case where two light measuring elements are employed. In this case, it is enough if the light measuring area of either one of the light receiving elements is included within the body of the subject person. The light measuring areas are located symmetrically in the horizontal direction with respect to he center of the scene. The light measuring areas are vertically a little down from the center as in the case of FIG. 2. With this arrangement, the light measurable range are expanded in the horizontal direction and the possibility of catching the subject person with a light measuring area is higher than in the case that a single light measuring area is employed. Attention should be paid in the case of two light measuring elements such that the condition as shown in FIG. 5 will not occur.

Figure 5:
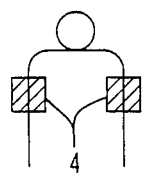
FIG. 5 is an explanatory illustration showing the case where at least one of two partial light measuring areas is not completely included in a person to be photographed.
Figure 6:
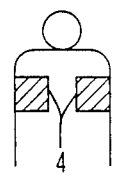
FIG. 6 is an explanatory illustration showing the case where the two partial light measuring portions are completely included within the person to be photographed.

In the exemplary case as shown in FIG. 5, the space between the light receiving element is so large that neither of the light measuring ranges is fully included in the body of the subject person although the person is within the maximum available distance. In such a condition, if the brightness of the portion of the subject person in the light measuring range is lower than the brightness of the remaining portion in the light measuring range, correct exposure is not expected as explained with reference to FIG. 2. To cope with the problem, the light measuring areas may be located as shown in FIG. 6 such that both areas are at the limits of the inclusion within the body of the subject person at the maximum available distance. Now, assume a numerical consideration with reference to FIG. 7 about how much portion of the subject person is, occupied or covered by the light measuring areas. Assume that the maximum available distance is 4.5 m that the light acceptance angle of each light receiving element is 2.5° and that the width of the body, i.e. shoulder of a person is 45 cm in average. (see FIG. 7 (1)). In this case, the angle viewing the width of the body of the subject person is $\tan^{-1}$ (45 cm/4.5 m)=5.7° (see FIG. 7 (2)). From this calculation, the partial light measuring areas will cover the body of the subject person as shown in FIG. 7 (3). FIG. 7 (4) shows the range within which the subject person may move to the right or left with at least either one of the light measuring range fully covering the body of the person. The range is 2d'=6.4° by the viewing angle and 2d'—51 cm by distance.

FIG. 8 shows a light measurable range for the same camera-to-object distance and light measuring area 4 of each light receiving element as those of FIG. 3, with the light measuring areas being arranged in the same manner as in the case of FIG. 6. The subject person may be moved to the right or left by a double distance 2d in comparison with the case shown in FIG. 3.

FIG. 9 shows an exemplary arrangement of the light measuring areas wherein three light measuring elements are employed. In this case, the adjacent two light measuring areas should have the relationship that was described with reference to FIG. 6.

FIG. 10 shows the light measurable range of the case of FIG. 9, with the assumption that the camera-to-object distance and the light measuring range for each light receiving element are the same as those of the FIG. 3 case. At this time, the subject person may be moved to the left or right within the distance of three times as much as that of the FIG. 3 case.

FIGS. 11 (1) and (2) respectively show other examples of the light measuring area arrangements in the case of three light receiving elements Those examples are designed in consideration of the picture taking with the vertical position of the camera. The light measurable range for a subject person is larger in comparison with he case of FIG. 9.

FIGS. 12 (1) and (2) respectively show examples of the light measuring area arrangement in the case of four light receiving elements being employed. FIG. 13 shows an exemplary arrangement of the light measuring areas in the case of five light receiving elements. With the arrangements of FIGS. 12 and 13, the light measurable range is larger in the horizontal and vertical directions both for the standard and vertical camera positions, in comparison with the case of FIG. 9.

Figure 14:
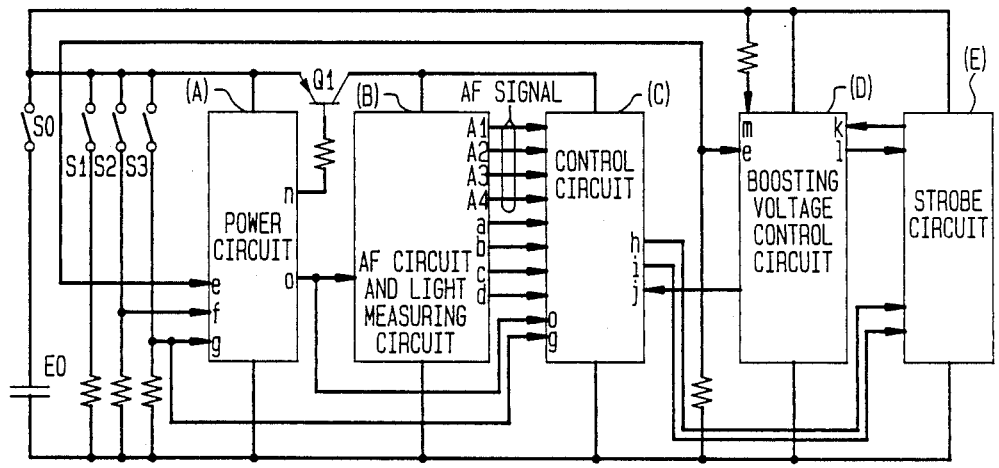
FIG. 14 is a block diagram showing the general camera circuit construction.

FIG. 14 shows the general circuit construction of a control circuit for a lens shutter camera provided with a diaphragm shutter, as an embodiment according to the present invention. The block A is a power maintaining circuit for maintaining the source power. A block B comprises a light measuring circuit for measuring the brightness of the object to be photographed, and an automatic distance detecting circuit (referred to as AF circuit hereinafter) which detects the camera-to-object distance. A block C is a control circuit which controls the camera exposure, the objective lens and the light emission of a strobe. A block D is a boosting voltage control circuit for controlling the voltage boosting operation for the power source of a strobe circuit E represented by a block E. The strobe circuit E includes a main capacitor, a flash tube and a voltage boosting circuit. A power switch S0 is interlocked with a camera lens cover (not shown) such that the switch S0 is closed, i.e. turns ON in response to the opening of the lens cover. A power supply S1 is closed, i.e. turned on with a shutter release button (not shown) being depressed down by a first stroke. A release switch S2 is closed with the shutter release button being depressed down by a second stroke. An exposure completion switch S3 is closed with the camera shutter and its related mechanism being cocked, and is opened upon completion of an exposure A power supply transistor Q0 supplies power from a power source E0 to the blocks B and C.

Figure 15:
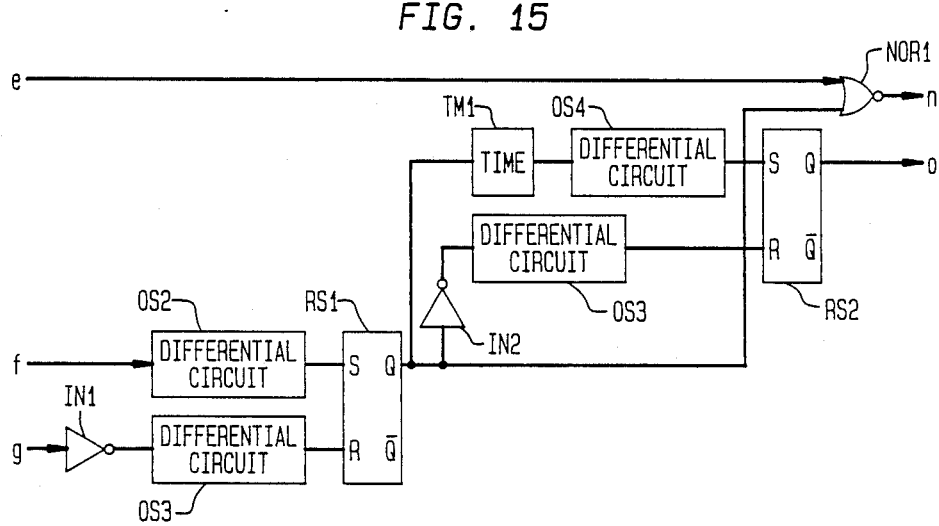
FIG. 15 is a diagram showing in detail the circuit of the power maintaining circuit shown by the block A in FIG. 14.

FIG. 15 shows an exemplary definite construction of the power maintaining circuit shown as the block A. When the shutter release button is depressed by a first stroke to close the switch S1, a first operation signal e turns to a "High" level (hereinafter referred to as "H"). When the "H" signal is applied to NOR gate NOR1, the NOR gate NOR1 outputs a "Low" level (hereinafter referred to as "L") signal as a power supply signal n, which in turn render the transistor Q1 conductive to supply power to the blocks B and C. Subsequently, when the shutter release button is depressed down by the second stroke, the release operation signal f turns to "H" which is applied to a differential circuit OS2 so that a differential signal is applied to the set terminal of an RS flip-flop RS1. Accordingly, the RS flip-flop RS1 is set to render its Q output "H" which "H" signal is output to the NOR gate NOR1 to maintain the output of the latter gate at "L", whereby the power supply is maintained.

The Q outputs of the RS flip-flop RS1 is also output to a time TM1 which is set by a "H" signal input and outputs a "H" signal after a lapse of a given period. If the input signal is turns to "L" during the given period or after lapse of the given period, the time TM1 maintain its "L" output when the output is "L" and turns to "L" when the output is "H". The given period is determined to cover the time required for the light measuring circuit and the AF circuit to respond to the power supply. After lapse of the given period, the timer TM1 output "H" signal which is converted by a differential circuit OS4 into a differential signal which sets an RS flip-flop RS2. Hence, the Q output of the RS flip-flop RS turns to "H" and is output as a release signal O. In response to the release signal, the camera shutter begins to open When the shutter is closed after lapse of an appropriate exposure time necessary for the picture taking, an exposure completion signal g turns to "L" which is inverted by an inverter to "H" which in turn is converted to a differential signal by a differential circuit OS3. The differential signal is applied to the reset terminal of the RS flip-flop RS1 to reset the latter and render its Q output "L". The Q output of "L" is inverted by an inverter IN2 to "H" and is applied to a differential circuit OS3. The differential circuit OS3 converts the input signal to a differential signal which is output to the reset terminal of the RS flip-flop to reset the latter and render its Q output "L". The "L" Q output of the RS flip-flop RS1 is applied to the NOR1 gate 1. Then, the NOR gate NOR1 waits for the signal e turning to "H" in response to turning OFF of switch S1 whereupon the NOR gate NOR1 outputs "H" signal to stop the maintenance of the power supply.

Figure 16:
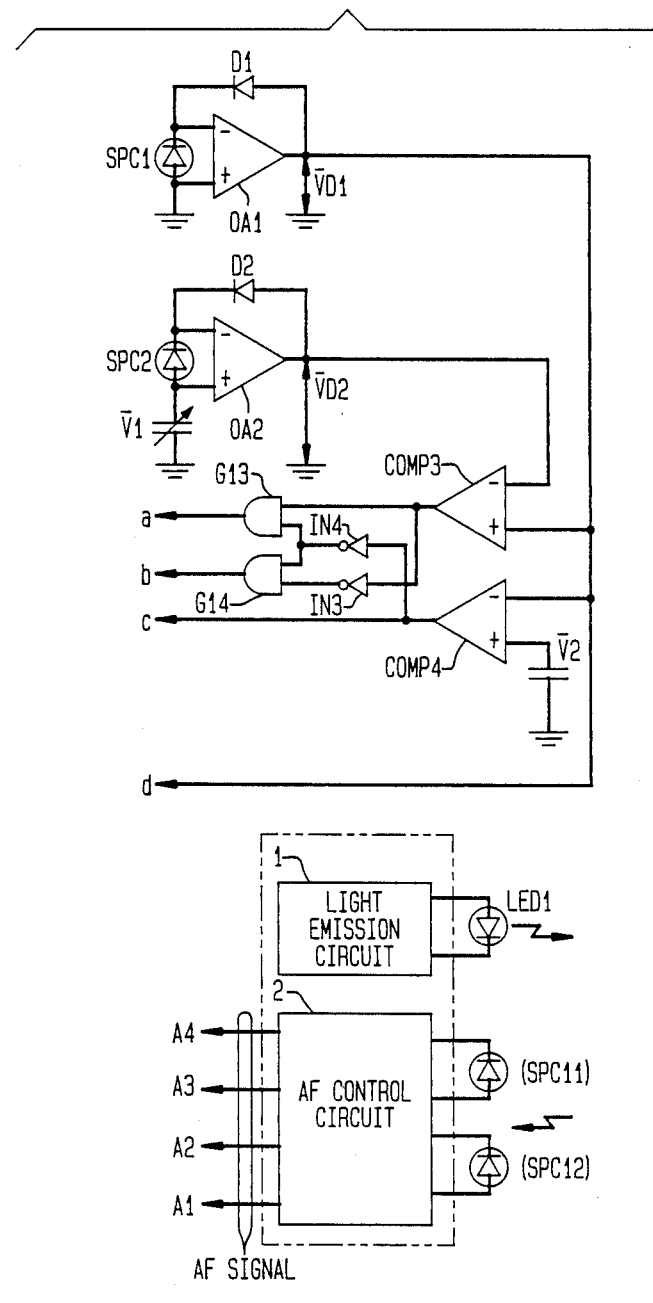
FIG. 16 is a diagram showing in detail the light measuring and distance detecting circuit shown by the block in FIG. 14.

FIG. 16 shows exemplary definite circuits of the light measuring circuit and the AF circuit in the block B. A silicon photocell SPC1 is for average or integral light measurement and a silicon photocell SPC2 is for spot or partial light measurement. OA1 and OA2 denote operational amplifiers respectively. Diodes D1 and D2 respectively convert the photoelectric current of the silicon photocells SPC1 and SPC2 into logarithmically compressed voltages. A comparator COMP3 compares the non-inverting input of the voltage VD1 at the anode of the diode D1 and the inverting input of the voltage VD2 at the anode of the diode D1. A comparator COMP4 compares the inverting output of the voltage VD1 at the anode of the diode D1 and the non-inverting input of a reference voltage V2. A voltage source V1 is connected between the anode of the silicon photocell SPC2 and the ground line to add a given voltage to the voltage logarithmically compressed by the diode D2.

An infrared light emitting diode (referred to as an infrared LED hereinafter) LED1 emits infrared light for distance detection by means of triangulation. A pair of silicon photocells SPC11 and SPC12 receives the infrared light emitted from the infrared LED LED1 and reflected by the object to be photographed. The AF circuit comprises a light emission circuit 1 for energizing the infrared LED LED1, and AF control circuit 2 which receives the photoelectric currents from the silicon photocells SPC11 and SPC12, makes a calculation with the data of the received photoelectric currents and converts the data into a signal representing the object distance. The signal of the object distance (hereinafter referred to as an AF signal) is one of the signal A1, A2, A3 and A4 which respectively represent near, medium, far and infinite distance zones. The AF signal is output to the control circuit of the block C. Exemplary distance ranges for the zones are shown in the Table 1.

TABLE 1

| Signal | Range of Distance (m) |
|---|---|
| A1 (near) | 1–1.4 |
| A2 (medium) | 1.4–2 |
| A3 (far) | 2–4 |
| A4 (infinite) | 4–infinity |

When the switch S1 is turned on, the light measuring circuit and the AF circuit are supplied with electric power and begin to operate. The silicon photocell SPC1 for the average light measurement produces photoelectric current commensurate with the brightness of the average light measuring area and the voltage VD1 proportional to the logarithm of the photoelectric current appears at the anode of the diode D1. At the anode of the diode D2 appears the sum of the voltage VD3 proportional to the logarithm of the photoelectric current produced as a function of the brightness of the partial light measuring area, and the voltage V1 to be added thereto, i.e. the sum voltage VD2 =VD3 +V1. The voltage V1 is set to detect whether the ratio of the brightness of the average and partial light measuring areas is more than a given value. For example, assume that it is desired to detect whether the brightness of the average light measuring area is more than four times as much as the brightness of the partial light measuring area, i.e. whether the difference of the brightnesses is more than two steps by the APEX brightness value When the ratio of the brightness of the photocells SPC1 and SPC2 is also two and the difference of the voltages VD1 and VD2 is about 18 mV at 25° C. Accordingly, to detect whether the ratio of brightness is more or less than four, the voltage VI is set to 18 mV×2=36 mV and the voltage is added to the voltage VD3, with the voltage VD2=VD3+V1 may be compared with the output voltage VD1 of the average light measuring section.

The voltages VD1 and VD2 are input to the comparator COMP3 as its non-inverting and inverting inputs to be compared with each other. When the result of the comparison shows VD1>VD2, i.e. when the brightness of the average light measuring area is higher than the brightness of the partial light measuring area by a ratio more than the given value, the comparator COMP3 outputs "H" signal In the present embodiment, contralight condition is determined when the "H" signal is detected. The voltage VD1 as the non-inverting input of the comparator COMP3 is also applied to another comparator COMP4 as its inverting output. To the non-inverting output of the comparator COMP4 is applied a reference voltage V2. The comparator COMP4 determines whether the voltage VD1 is lower than a given value or not. When the voltage VD1 is lower than the given value, the comparator COMP4 outputs a "H" signal. In the present embodiment, low brightness condition is determined at that time. A logic circuit composed of AND gates G13 and G14 and inverters IN3 and IN4, outputs signals (a) (b) and (c) in accordance with the outputs of the comparators COMP3 and COMP4. The signal (a) is "H" in the case of contralight and non-low-brightness condition. The signal (b) is "H" in the case of neither contralight nor low brightness condition. The signal C is "H" in the case of low brightness condition. Those signals are selectively output to the block C, i.e. the control circuit. The voltage VD1 is directly output to the control circuit of the block C as a signal d that represents the brightness of the average light measurement. Table 2 shows the output levels of those signals a, b, and c.

TABLE 2

| | Low Brightness | | Not Low Brightness | |
|---|---|---|---|---|
| | Contralight | Non-Contralight | Contralight | Non-Contralight |
| a | L | L | H | L |
| b | L | L | L | H |
| c | H | H | L | L |

Figure 17:
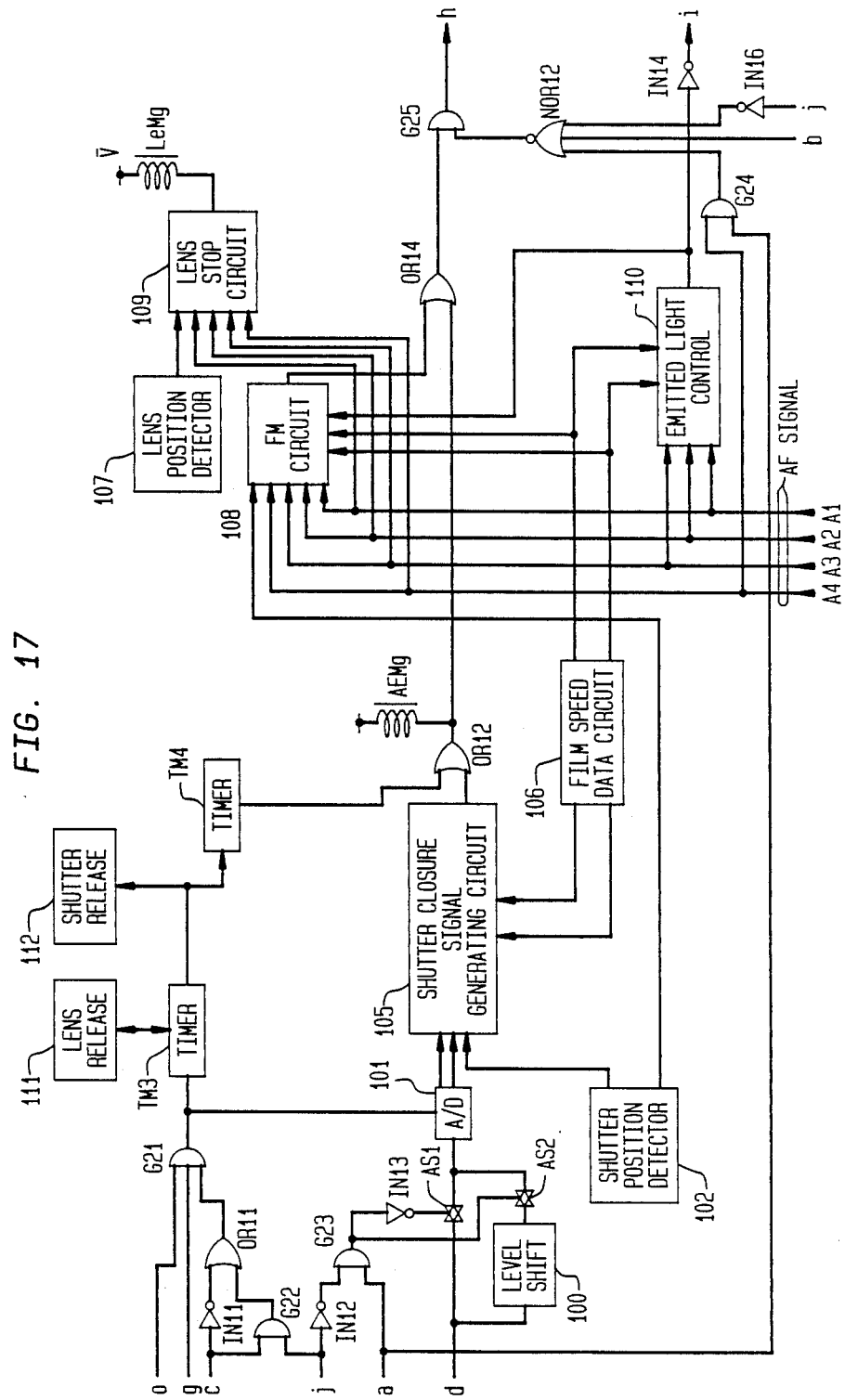
FIG. 17 is a diagram showing in detail the control circuit shown by the block C in FIG. 14.

FIG. 17 shows an exemplary definite circuit of the block C. A level shift circuit 100 shifts the level of the voltage signal d that represents the brightness of the average light measurement. Analog switches AS1 and AS2 conduct in response to a "H" signal. An A/D converter circuit 101 is responsive to a "H" signal from an AND gate G21 to convert the analog signal which has passed through the analog switches AS1 or AS2, into a digital signal. A shutter position detecting circuit 102 generates a signal representing the position of the shutter while the latter is travelling. A shutter closure signal generating circuit (referred to as AE circuit hereinafter) 105 receives the signals from the A/D converter circuit 101 and the shutter position detecting circuit 102 and a film speed signal from a film speed data circuit 106 which will be described later. The AE circuit 105 supplies a shutter closing signal to a shutter magnet AEMg when the received signals reach a given relationship. The film speed data circuit (referred to as SV circuit hereinafter) 106 converts the data of a film speed, i.e. ISO sensitivity into an electric signal and outputs the signal.

A timer TM3 operates in response to an "H" signal from the AND gate 21 to supply a lens release initiating signal to a lens release device 111 after a lapse of a given time from the application of the "H" signal. The timer TM3 also supplies a shutter release initiating signal to a shutter release device 112 after a lapse of another given time from the start of the lens releasing. A timer TM4 starts time counting in response to the shutter release initiating signal and produces an enforcedly shutter closing signal after a lapse of a time corresponding to a blur occurring critical shutter speed. A lens position detecting circuit 107 generates a signal representing the position of the objective lens while the lens is traveling. A flashmatic circuit (hereinafter referred to as FM circuit) 108 receives an AF signal representing the camera-to-object distance from the AF circuit, the film speed signal from the SV circuit 106, a light amount determination signal from an emitted light control circuit 110 which will be described below, and a shutter position signal from the shutter position detecting circuit 102. The FM circuit output a signal when the shutter, after the start of opening, reaches a position to have an opening corresponding to a diaphragm value that provides an exposure suitable for flash photography. A lens stopping circuit 109 receives the lens position signal from the lens position detecting circuit 107 and the AF signal from the AF circuit to output a signal for actuating lens magnet LeMg and stopping the lens when the lens travels to a position commensurate with the object distance. A light emission control circuit 110 receives the AF signal from the AF circuit and the film speed data signal from the SV circuit 106 to determine whether the maximum object distance for which a suitable exposure is given with the fully open diaphragm aperture, is larger than the distance represented by the AF signal in the case where the guide number of the strobe is switched to a smaller value.

Figure 18:
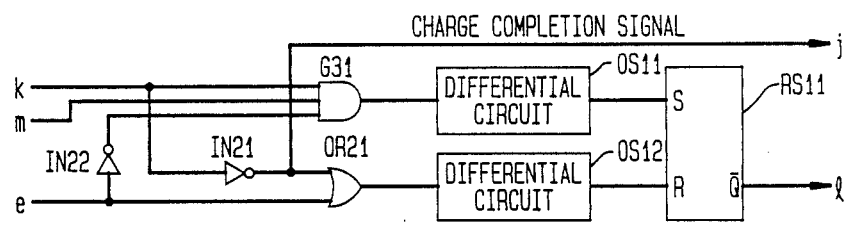
FIG. 18 is a diagram showing in detail the voltage boasting control circuit shown by the block D in FIG. 14.

FIG. 18 shows a definite circuit arrangement of the voltage boosting control circuit of the block D in FIG. 14. First, signals k and m to be input to the circuit are explained. The signal k is an incompleted charge signal that is "H" when the charged voltage of a first main capacitor CM1 (see FIG. 20) has not reached a given level. The signal m is a main switch signal which is "H" when the main switch S0 is at ON state. When the main switch SO is turned on, the main switch signal m turns to "H" and is applied to an AND gate G31. If the charged voltage of the first main capacitor CM1 has not reached the given level at that time, the incompleted charge signal is "H". When the switch S1 has not been turned on, the first operation signal e remains at "L". The "L" signal is inverted to "H" by an inverter IN22 and input to an AND gate G31 together with the incompleted charge signal. In response to those signals, the output of the AND gate G31 becomes "H" and the "H" signal is converted into a differential signal by an differential circuit OS11. The differential signal is input to the set terminal S of an RS flip-flop RS11 to set the latter. With the setting of the RS flip-flop RS11, the Q output of the RS flip-flop as the voltage boosting control signal l turns to "L" to make conductive a voltage boosting control transistor Q11 of the strobe circuit shown in FIG. 20 and start the voltage boosting. If the switch S1 is turned on to make the first operation signal e "H" during the voltage boosting, the "H" first operation signal is supplied through an OR gate OR21 to an differential circuit 12. The differential circuit 12 converts the input signal into a differential signal which is applied to the reset terminal R of the RS flop-flop RS11. The signal resets the RS flip-flop RS11 so that into $\bar{Q}$ signal as a voltage boosting control signal l becomes "H" to make the voltage boosting control transistor. Q11 non-conductive and stop the voltage boosting operation. After that, when the switch S1 is turned off, the first operation signal e becomes "L" so that an inverter IN22 for inverting the signal e outputs "H" signal which is applied to an AND gate G31. As the switch S0 has been turned on with the charging of the first main capacitor CM1 being incompleted, the AND gate G31 outputs a "H" signal and the RS flip-flop RS11 is set through the differential circuit as in the above mentioned case so that the voltage boosting control signal l becomes "L" to restart the voltage boosting. The voltage boosting is continued until the charged voltage of the first main capacitor CM1 reaches a given level, i.e. the charging of the first main capacitor is completed, whereupon the charge uncompletion signal K becomes L which is inverted to "H" by an inverter 21 and is output to the OR gate OR21. After that, in the same manner as in the case of the switch S1 being turned on, the "H" output of the OR gate OR21 is converted by a differential circuit OS12 into a differential signal which in turn reset the RS flip-flop RS11 so that the $\bar{Q}$ output of the flip-flop RS11, as the voltage boosting signal l becomes "H" to stop the voltage boosting operation.

When the incompleted charging signal K becomes "L", the AND gate G31 is blocked. In the present embodiment, the hysteresis characteristics of a Neon tube is utilized such that the charge completion signal is responsive to a first given voltage to stop the voltage boosting and to a second given voltage which is lower than the first given voltage, to ensure the flash firing. The incompleted charge signal K is maintained at "L" to maintain the output of the AND gate G31 at L after the charged voltage of the first main capacitor CM1 reached the first given voltage until the charged voltage drops to the second given voltage. In other words, after the charged voltage of the first main capacitor CM1 reached the first given voltage, the voltage boosting operation is not in effect in spite of the change of the charged voltage until the latter voltage drops to the second given level. A signal j is the charge completion signal indicating the completion of the charging and is obtained by inverting the incompleted charge signal by the inverter IN21.

Figure 19:
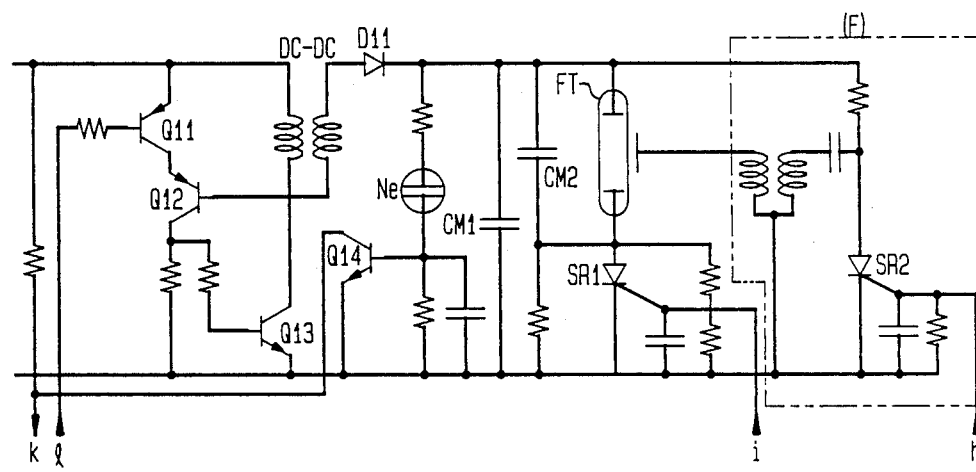
FIG. 19 is a diagram showing in detail the electronic flash or strobe circuit E shown by the block E in FIG. 14.

FIG. 19 shows an exemplary definite circuit of the strobe circuit shown by the block E in FIG. 14. A voltage boosting control transistor Q11 controls the voltage boosting operation. A feedback transistor Q12 feedbacks the current. An oscillation transistor Q13 makes the DC-DC converter oscillate. A booster transformer DC-DC converts a low-voltage to a high voltage. A rectifier diode D11 rectifies the output of the transformer DC-DC. A Neon tube Ne conducts when the main capacitor CM1 reached a given voltage. A boosting stopping transistor Q14 turns on to stop the voltage boosting operation when the Neon tube Ne conducts. The first main capacitor and a second main capacitor CM1 and CM2 respectively store electric charge for the flash firing. The amount of charge to be stored in the second main capacitor is less than the amount of large stored in the first main capacitor CM1. A flash tube FT receives the high voltage from a trigger circuit and discharges the charge stored in the first and second main capacitors CM1 and CM2 to emit flash light. A thyrister SR1 switches the amount of strobe light to be emitted. When the thyrister SR1 is conductive, the first and second main capacitors CM1 and CM2 are discharged to provide a large amount of strobe or flash light. When the thyrister SR2 is not conductive, only the second capacitor CM2 is discharged to provide a small amount of flash light. In this way, the guide number of the strobe is switched between a large and small values in accordance with the ON and OFF of the thyrister SR1. The block F surrounded by a broken line is a trigger circuit which responds to a trigger signal h to turn on thyrister SR2 and generate a high voltage for firing the flash tube FT.

Before describing the definite circuit of the above mentioned emitted light amount control circuit 110 and the FM circuit 108, explanation will be made as to how the maximum available distance, i.e. the maximum camera-to-object distance within which a switchable exposure is guaranteed with the fully open diaphragm aperture, will change with the film sensitivity when the guide number of the strobe is switched between a large and small values. Explanation will also be made as to which of the distance zones indicated by the AF signal supplied from the AF circuit corresponds to the maximum distance. In the following explanation, it is assumed that the fully open aperture is F2.8 and that the large and small guide numbers of the strobes are respectively 12 and 16. The maximum available distance for the film of ISO100 is calculated from a known formula GN (guide number)=FNo. (Aperture)×D (distance). From the equation, when GN=6, the maximum available distance will be about 2.1 m with the fully open aperture FNo.=2.8. If a film of F200, the maximum available distance will be doubled to 3 m. The maximum available distance will be about 4.2 m for a film of IS0400 and about 6.1 m for a film of ISO1000. Let's compare the maximum available distance with the distance zone indicated by the AF signal, and consider within which distance zone pictures of proper exposure can be obtained. When a film of ISO100 is employed, the maximum available distance is 2.1 m and flash photography of a switchable exposure is available as far as the medium zone. In this case, a suitable exposure is obtained for the object at the distance, but about 1 step overexposure is given for the object at the distance of 1.4 m since the medium zone ranges from 1.4 m to 2 m. However, negative type films have generally large latitudes which allows overexposure as much as about five to six steps. Hence, the one step overexposure from a suitable exposure will not cause any problem. On the other hand, the latitude of the negative films generally extends as much as about two steps to the underexposure side. Accordingly, it is preferable that the underexposure should be as little as possible in flash photography, although the situation is the same in the day light photography. In consideration of those facts, photography is available as far as the medium zone with the film of IS0200 the diaphragm aperture being F4.3, as far as far distance zone with the film of IS0400, the diaphragm aperture being F2.8 and as far as the far distance zone with a film of ISO1000, the diaphragm aperture being F4.3.

Table 3 shows relationship among the guide number of a strobe, the object distance and the diaphragm aperture, value, that will be given in accordance with the formula GN=FNo.×D. Table 4 shows the relationship among the strobe guide number, object distance and the diaphragm aperture value given by the present invention.

TABLE 3

| ISO | | Zone Distance | Near 1 | Medium 1.4 | Far 2 | Infinity 4 (m) |
|---|---|---|---|---|---|---|
| 100 | FNo. | GN6 | 4.3 | 3 | | |
| | FNo. | G12 | 8.6 | 6 | 3 | 2.8 |
| 200 | FNo. | GN6 | 6 | 4.3 | | |
| | FNo. | G12 | 12.1 | 8.6 | 4.3 | 2.8 |
| 400 | FNo. | GN6 | 8.6 | 6 | 3 | |
| | FNo. | G12 | 17.2 | 12.1 | 6 | 2.8 |
| 1000 | FNo. | GN6 | 12.1 | 8.6 | 4.3 | |

TABLE 3-continued

| ISO | | Zone Distance | Near 1 | Medium 1.4 | Far 2 | Infinity 4 (m) |
|---|---|---|---|---|---|---|
| | FNo. | G12 | 24.2 | 17.2 | 8.6 | 4.3 |

TABLE 4

| ISO | | Zone Distance | Near 1 | Medium 1.4 | Far 2 | Infinity 4 (m) |
|---|---|---|---|---|---|---|
| 100 | FNo. | GN6 | 4.3 | 3 | | |
| | FNo. | G12 | | | 3 | |
| 200 | FNo. | GN6 | 6 | 4.3 | | |
| | FNo. | G12 | | 4.3 | | |
| 400 | FNo. | GN6 | 8.6 | 6 | 9 | |
| | FNo. | G12 | | | | |
| 1000 | FNo. | GN6 | 12.1 | 8.6 | 4.3 | |
| | FNo. | G12 | | | | |

Figure 20:
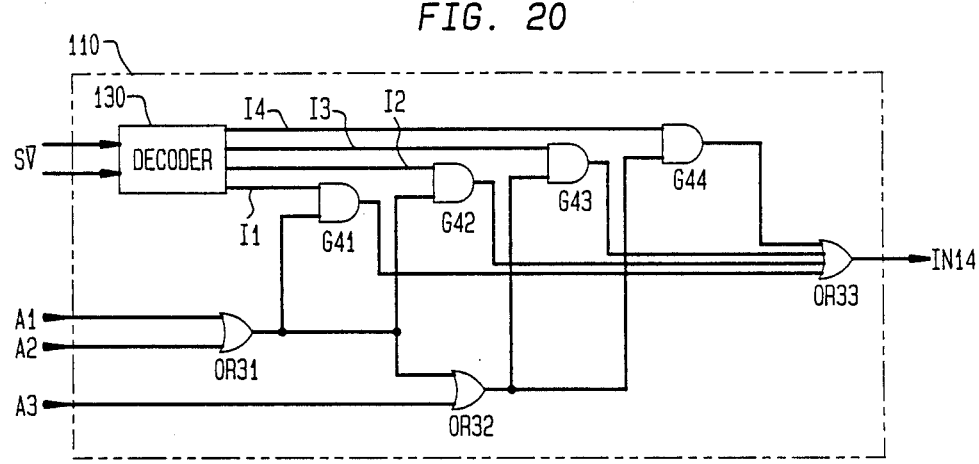
FIG. 20 is a circuit diagram showing in detail the emitted light control circuit shown in FIG. 17.

FIG. 20 shows an exemplary definite circuit of the emitted light amount control circuit 110. With reference to the Figure, the ISO signal is supplied from the SV circuit 106 in the form of two bit digital signal, to a decoder 130 to be decoded thereby and output as signals I1 through I4. The decoded ISO signal I1 through I4 respectively correspond to the film speeds of ISO100, 200, 400 and 1000. As the film of ISO100 enables suitable exposure as far as the medium zone, the signal I1 representing ISO100 is applied to one input terminal of AND gate G41 of which the other input terminal receives the output of OR gate OR31 which receives the signal A1 representative of near zone and the signal A2 representative of medium zone. With this arrangement, if the AF signal shows the far distance zone, the output of an AND gate G41 will be "H" which is applied to ORgate OR33 which in turn outputs "H" signal as a signal that the amount of flash light is less.

In the same manner, when a film of ISO200 is used, an AND gate 42 receives a signal I2 representative of ISO200 and the output of OR gate OR31 representative of the medium distance zone. The output of the AND gate AN42 is applied to the OR gate OR33. When a film of ISO400 is used, a suitable exposure is available as far as the far distance zone so that the signal I3 representative of ISO400 is applied to our input terminal of an AND gate G43 which receives at its other input terminal the output of an OR gate 32 which receives the output of the OR gate 31 representative of the medium distance zone and the signal A3 representative of the far distance zone. The output of the AND gate 43 is supplied to the OR gate OR33. When a film of ISO1000 is used, the output of the OR gate representative of the far distance zone and the signal representative of ISO1000 are input to an AND gate G44 of which output is supplied to the OR gate OR33. With the above described arrangement, the OR gate OR33 outputs a "H" signal in the case a small amount of guide number, i.e. a small amount of emitted light is expected to suffice. In the other cases, for example, if the signal A3 representative of the far distance zone is supplied as the AF signal with a film of ISO100 being used, the OR gate OR33 outputs a "Low" signal to switch the guide number of the strobe to the large value. The signal from the OR gate OR33 is inverted by an inverter IN14 to be a signal i which is applied to the gate SR1.

Figure 21:
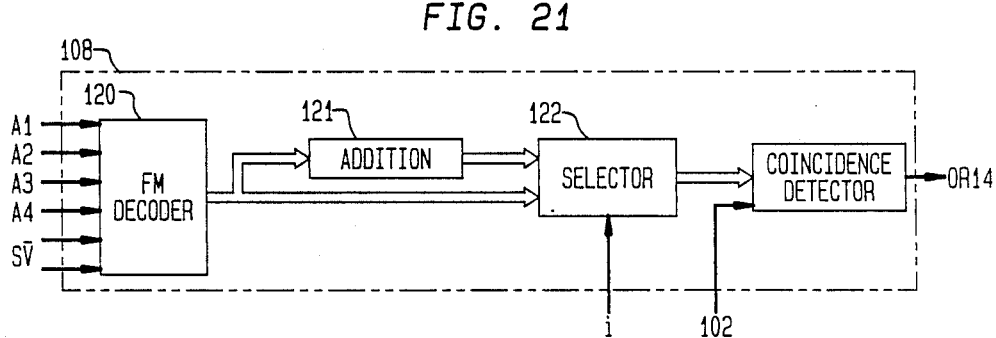
FIG. 21 is a circuit diagram shows in detail the FM circuit shown in FIG. 17.

FIG. 21 shows an exemplary definite circuit of the FM circuit 108. The FM circuit 108 receives the data of the guide number GN and the object distance D and determines the diaphragm aperture value in accordance with the formula GN=FNo.×D. The FM circuit also receives the data of the ISO film speed to change the diaphragm aperture value as a function of the film speed data such that a suitable exposure can be provided. In the present invention, the guide number of the strobe is switched between a large and a small ones. Hence, a suitable diaphragm aperture must be determined in compliance with the selected guide number. For the simplicity of the circuit arrangement, the FM circuit of the present embodiment is arranged such that the diaphragm aperture value is determined in accordance with the above mentioned formula for one of the guide numbers, and that, for the other of the guide numbers, the diaphragm aperture value thus determined is shifted in response to the signal representative of the other guide number, by an amount commensurate with the difference of the guide numbers, thereby determining the diaphragm aperture value. That operation is explained in more detail with reference to FIG. 21.

With reference to FIG. 21, an FM decoder 120 receives the ISO film speed data signal from the SV circuit shown in FIG. 17 and the AF signals A1 through A4, and determines a diaphragm aperture value for proving a suitable exposure with the larger guide number of flash light. A signal representative of the determined diaphragm aperture value is supplied to an addition circuit 121 and a selector 122. The addition circuit 121 adds a given amount to the signal from the FM decoder 120 and supplies the selector a signal representative of a diaphragm aperture that will prove a suitable exposure with the smaller guide number of the flash light. The selector 122 selects the signal supplied from the addition circuit 121 or the signal directly supplied from the FM decoder 120, in accordance with the guide number selection signal i from the emitted light amount control circuit 110, the signal selected by the selector 122 being output to a coincidence circuit 123. Receiving an "H" signal as the signal i, the selector 122 outputs to the coincidence circuit 123 the signal supplied from the addition circuit 121. If an "L" signal is applied, the selector 122 outputs to the coincidence circuit 123 the signal directly supplied from the FM decoder. The coincidence circuit 123 receiving the diaphragm aperture value representing signal from the selector 123 and the signal representative of the travelling position (position in the travel) of the shutter, i.e. the instantaneous actual diaphragm aperture, outputs an "H" signal when the received signals coincide with each other.

Then, explanation will be made about the operation flow of the above described embodiment. The embodiment is designed to control the camera in response to various conditions upon photography. In the following, the operation will be described mainly with reference to FIG. 17 for each of the conditions classified to following three cases:
 (a) non-contralight condition and not low object brightness—AE photography
 (b) contralight condition but not low object brightness—daylight sunchro photography
 (c) low object brightness—flash photography
Now, explanation will be made for each case.

(a) Non-contralight, not low object brightness (AE photography)

When the shutter release button (not shown) is depressed down by the first stroke to close the power supply switch S1 with the power source switch S0 being closed, power is supplied to each circuit. With the power supply, the light measuring circuit of the block B performs the light measuring operation. The output of the light measuring circuit B is processed by the calculation circuit for the exposure calculation. As the result of the calculation, the states of the signals a, b and c will be a="L", b="H" and c="L". Those signals are supplied to the control circuit of the block C (see FIG. 17). With reference to FIG. 17, as the signal b is "H", the NOR gate NOR12 outputs an "L" signal to block the AND gate G25 so that the output of the AND gate G25, i.e. the trigger signal h is maintained at "L" level. Accordingly, the thyrister SR2 in FIG. 19 will not be turned on and the strobe is not fired. As the other signal a is "L", the AND gate G23 output an "L" signal which is inverted by the inverter IN13 to an "H" signal so that the analog switch AS1 is terminated on. As the result, the signal d representative of the object brightness is transmitted to the A/D converter 101 without being modified, and wait for A/D conversion. To initiate the A/D conversion, the AND gate G21 responds to the release signal 0, the exposure completion signal g and the output of the OR gate 11.

Assuming that the shutter has been cocked, the exposure completion signal g is "H". As the object brightness is not low, the signal C is "L" which is inverted by the inverter IN11 to "H" so that the OR gate 11 outputs "H" signal. If the release button (not shown) is depressed further by the second stroke, the release switch S2 is turned on to make the release operation signal f shown in FIG. 15 "H" so that the release signal 0 is made "H" through the power source maintaining circuit of the block A. Then, the output of the AND gate G21 will become "H" which is applied to the A/D converter 101 to initiate the A/D conversion of the brightness signal. The output of the AND gate G21 is also supplied to the timer TM3 which, in response to the signal, start time counting and outputs an "H" signal after a lapse of a time required for the A/D conversion and for the shutter to start opening. The "H" signal from the time TM3 initiates the releasing operation. The release operation releases the lens which moves forward for the focusing. The signal from the lens position detecting circuit 107 which detects the amount of movement of the lens, and AF signal from the AF circuit are applied to the lens stopping circuit 109 which outputs a signal for actuating the lens magnet LeMg and stopping the lens movement when the lens reaches a position corresponding to the object distance represented by the AF signal with the lens position signal being coincident with the AF signal.

The timer TM3 output a signal for initiating AE release (exposure initiation) and initiating the opening of a shutter (not shown) after a lapse of the maximum time for the initiation of the lens releasing to the stoppage of the lens, for example, the sum of the time required for the lens movement from the infinity position to the nearmost distance focused position or vice versa and the marginal time for safety. When the shutter begins to open, the AE circuit 105 receives a shutter position indicating signal from the shutter position detecting circuit 102, the object brightness indicating signal which has been converted from an analog to a digital signal by the A/D converter 101, and the film speed signal from the SV circuit 106. When the shutter position indicating signal reaches a value to satisfy a given relationship with the object brightness indicating signal and the film speed signal, the AE circuit 105 supplies an "H" signal to the OR gate OR12 to actuate the AE magnet to close the shutter. When the exposure terminates, the exposure completion signal g becomes "L" to block the AND gate G21 and turn off the timer TM3. In addition, if the depression of the shutter release button is released to open the power supply switch S1, the first operation signal e (see FIG. 15) becomes "L" and the power supply signal n becomes "H" to stop the power supply to each circuit.

(b) Contralight but Not Low Brightness

When the power source switch S0 is turned on with the charged voltage of the first main capacitor having not reached to the given level, voltage boosting operation is initiated to charge the first and second main capacitor, CM1 and CM2. If the shutter release button is depressed down by the first stroke before the first main capacitor CM1 is charged to the given voltage, the voltage boosting operation is stopped immediately. At the same time, power is supplied to the light measuring circuit B and light measurement is effected. As the object brightness is not low, the signals a, b and c representing the result of the light measurement will be a="H", b="L" and c="L". Those resultant signals are supplied to the circuit of the block C (see FIG. 17). As the charged voltage of the first main capacitor CM1 has not reached the given level, the charge completion signal j is "L" which is inverted by the inverter IN12 to "H" and applied to one input terminal of the AND gate G23. Since the signal a is applied to the other input terminal of the AND gate 23 is "H", the AND gate 23 outputs an "H" signal to make the analog switch AS2 conductive so that the analog signal d representative of the object brightness is shifted by the level shift circuit 100 to a lower brightness representing value, i.e. to the overexposure providing side, and is supplied to the A/D converter. This is for the purpose of automatically changing the diaphragm aperture and the shutter speed to make the exposure compensation for the contralight condition, since the charging of the first main capacitor has not completed and the flash light can not be used for the exposure compensation for the contralight condition.

If the trigger signal is supplied to the thyrister RS1 while the charged voltage of the first main capacitor CM1 has not reached the given level but has reached a level sufficient for light emission, the thyrister SR1 is to be turned on to fire the strobe. However, as the exposure control signal has been shifted to the overexposure side from a proper exposure value to provide sufficient exposure to the main object, the flash light emission in addition to the overexposure setting will result in overexposure even for the main object. To cope with this problem, the "L" of the charge completion signal representing the incomplete of the charging is inverted by the inverter IN16 to "H" which is applied to NOR gate NOR12 which in turn applies an "L" signal to the AND gate G25 to block the latter and enforcedly inhibit the flash firing. Then, if the shutter release button is depressed down further by the second strobe, the circuit will operate as described in the case (a) to effect exposure with the level shifted control value.

In contrast, if the charging of the first main capacitor has been completed, the charge completion signal j indicating the condition is "H" which is inverted by the inverter IN12 to "L" to block the AND gate G23 is that the AND gate 23 outputs an "L" signal which is inverted by the inverter IN13 to "H" and makes the analog switch AS1 conductive. Accordingly, the brightness signal d is transmitted to the A/D converter without being shifted. The AF signal produced by the AF circuit is applied to the emitted light amount control circuit 110 and the FM circuit 108. When the emitted light amount control circuit 110 operates as described above and outputs an "H" signal for selecting the smaller guide number, the inverter IN14 inverts the "H" signal to an "L" signal which is supplied as the emitted light amount switching signal to the gate of the thyrister SR1 of the strobe circuit shown in FIG. 19. In contrast, if the emitted light amount selecting circuit 110 output an "L" signal for selecting the larger guide number, the inverter IN14 inverts the signal and supplies an "H" signal to the gate of the thyrister SR11 of the strobe circuit shown in FIG. 19.

When the AF signal A4 representing the infinity is supplied, the AND gate G24 receiving the signal receives the signal a of "H" at the other input terminal thereof an supplies an "H" signal to the NOR gate NOR12. In response to the "H" signal, the NOR gate NOR12 outputs an "L" signal to the AND gate G25. Accordingly, the AND gate G25 is blocked so that its output signal h is "L" to enforcedly inhibit the flash firing. When the AF signal indicates a definite object distance with one of the signal A1, A2 and A3 being "H", the AND gate G24 supplied an "L" signal to the NOR gate NOR12. As the other signal b applied to the NOR gate NOR12 is also "L", the NOR gate NOR12 supplies an "H" signal to the AND gate G25. Accordingly, the AND gate G25 can output a trigger signal h of H to cause flash light emission for photography in response to the output of the OR gate OR14 becoming "H".

When the release button is depressed down further by the second stroke to close the release switch S2, the circuit performs the operation until the stoppage of the lens in the same manner as in the case (a). Then, if the timer TM3 outputs a release start signal, the shutter begins to open. The AE circuit 105 receives the brightness signal from the A/D converter 101 and the film speed signal from the SV circuit 106, and outputs an "H" signal when the shutter position indicating signal from the shutter position detecting circuit 102 and the brightness signal reaches a given relationship based on the film speed given by the film speed signal. Receiving the "H" signal, the OR gate OR12 outputs an "H" signal to actuate the AE magnet AFMg to close the shutter. The output of the OR gate OR12 is also supplied to the OR gate 14 which also receives the signal from the FM circuit 108. The FM circuit 108 outputs a signal when the opening of the shutter reaches a value corresponding to a diaphragm aperture for providing a suitable exposure for the flash photography. When the OR gate OR12 supplies the shutter closing signal before the shutter reaches the opening for the suitable flash photography exposure, the OR gate 14 passes the shutter closing signal such that the strobe is fired at the maximum opening of the shutter determined by the AE circuit 105. In contrast in case where, before the shutter closing signal is applied to the OR gate 14, the FM circuit 108 output a signal for firing the strobe at the diaphragm aperture for providing a suitable flash exposure, the strobe is fired at that time. The shutter is closed when it reaches an opening determined by the AE circuit to 5.

The OR gate OR14 supplies an "H" signal to the AND gate G25. As described before, when the AF signal indicates a definite object distance, the AND gate 25 outputs an "H" trigger signal to turn on the thyristor SR2 and actuate the trigger circuit F so that a high voltage is applied to the flash tube FT. When the signal for selecting the smaller guide number is supplied from the emitted light amount control circuit 110, the inverter IN14 supplies an "L" signal as the emitted light amount switching signal to the strobe circuit E. At this time, the thyrister SR1 is not turned on. Accordingly, only the charge stored in the second capacitor CM2 is discharged through the flash tube. If the emitted light amount control circuit 110 supplies a signal for selecting the larger guide number, the emitted light amount selection signal of "H" turns on the thyrister SR1. Accordingly, the charge stored in both first and second main capacitors CM1 and CM2 is discharged through the thyrister SR1 and the flash tube FT.

(c) Low Object Brightness (Flash Photography)

The circuit operation for the low brightness condition is substantially the same as in the case (b), i.e. the contralight condition and not low object brightness. In the following, explanation will be made of the points different from the operation in the case (b). When the power source switch S0 has been turned on and the first main capacitor CM1 as not been charged to the given level, the voltage boosting operation is effected to charge the first and second main capacitor CM1 and CM2. If the shutter release button is depressed by the first stroke before the charged voltage of the first main capacitor CM1 reaches the given level, the voltage boosting operation is stopped immediately. At the same time, power is supplied to the light measuring circuit B to effect light measurement. As the object brightness is low, the resultant light measurement signals will be such that a="L", b="L" and c="H". Those signal are supplied to the control circuit of the block C (see FIG. 17). As the signal a is "L", the AND gate G23 receiving the signal is blocked to output an "L" signal which is inverted by the inverter IM13 to "H" and makes the analog switch AS1 conductive so that the brightness signal d is supplied to the A/D converter circuit 101 without being shifted. The AND gate G24 also receives the signal a and is blocked to supply an "L" signal to the NOR gate 12. The NOR gate NOR12 receives at the other input terminal the signal b of L. Accordingly, those two input signals make the NOR gate supply an "H" signal to the AND gate 25. In response to the signal, the AND gate 25 outputs an "H" trigger signal h for flash firing upon generation of the "H" signal from the OR gate OR14.

While the charge completion signal j is "L" with the charged voltage of the first main capacitor CM1 being below the given level, the AND gate 22 receiving the signal j is blocked to supply a "L" signal to the OR gate OR11. Due to the low object brightness, the signal c is "H" which is inverted by the inverter IN11 to an "L" signal and applied to the OR gate OR11. The OR gate OR12 receiving those two "L" signals supplies an "L" signal to the AND gate G21. Accordingly, the AND gate G21 does not outputs an "H" signal even if the shutter release button is depressed by the second stroke to close the release switch S2 and make the release signal 0 "H", so that the releasing is locked. If the release button is released, the voltage boasting is effected again. If the shutter release button is depressed by the first stroke after the first main capacitor CM11 has been charged to the given voltage, the charge completion signal that has become "H" is applied to the AND gate G22 which in turn supplies an "H" signal to the AND gate G21 through the OR gate OR11. Thus, the lock of the releasing is released. Subsequently, if the release button is depressed by the second stroke to closed the release switch S2 and makes the release signal 0 "H", the AND gate G21 outputs an "H" signal to initial the release operation and the A/D conversion. Then, the circuit operates as in the case C of contralight condition. However, it is likely to occur that the low brightness makes the exposure time so long as to cause blur in the picture. To avoid this problem, a timer TM4 is actuated simultaneously with the AE release. After a lapse of a time corresponding the minimum blur occurring shutter speed, the timer TM4 supplies an "H" signal to the OR gate OR12 to actuate the AE magnet AE Mg to close the shutter.

Figure 22:
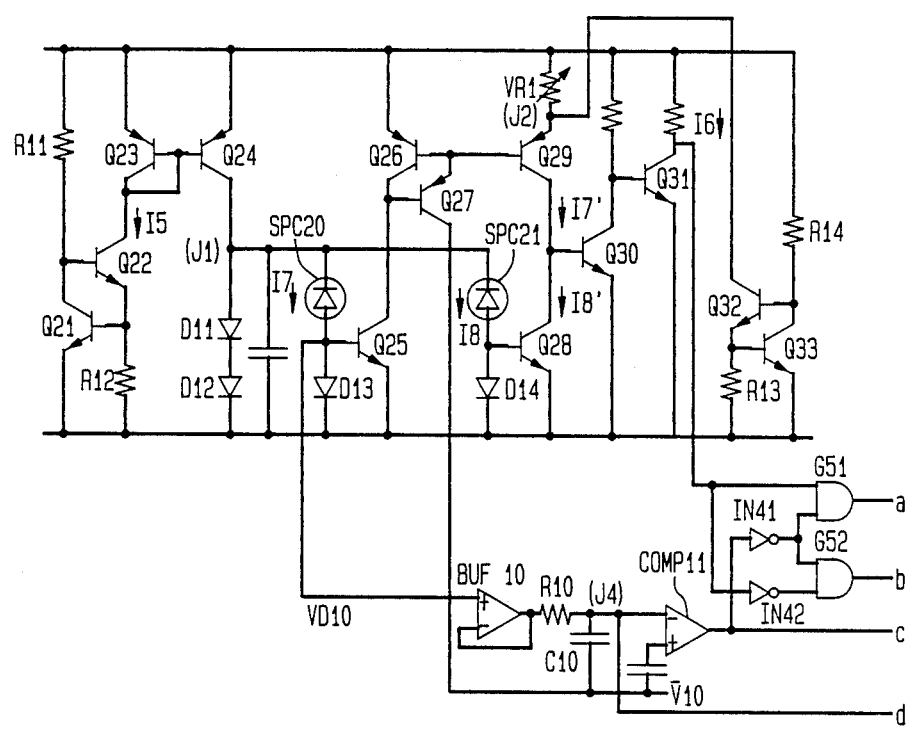
FIG. 22 is a circuit diagram showing a first modification of the light measuring circuit shown in FIG. 16.

FIG. 22 shows a first modification of the light measuring circuit shown in FIG. 16. Transistors Q21 and Q22 and resistors R11 and R12 together composes a known constant current circuit. Transistors Q23 and Q24 supply to the diodes D11 and D12 the constant current I5 generated by the above mentioned constant current circuit so that a stable voltage caused by the two serial diodes is supplied to the junction J1 between the diode D11 and the transistor Q24. An average light measuring element SPC20 has lights mode connected to the junction J1 to supply photoelectric current I7 to the diode D13. The diode D13 receiving the photoelectric current I7 and generates a voltage VD10 as the logarithmically compression of the current I7.

The circuit composed of the transistors Q26 and Q27 generates current equal to the photoelectric current I7. A transistor Q29 which is in current mirror connection with the transistor Q26, has its emitter connected with the variable resistor VR1. The junction between the emitter of the transistor 29 and the variable resistor VR1 is connected with the collector of a transistor Q32 to receive a constant current I6. A partial or spot light measuring element SPC21 has its anode connected to the junction j1 to supply a photoelectric current I8 to the diode D14. The diode D14 generates a voltage VD11 as a logarithmic compression of the photoelectric current I8. A transistor Q28 has its base connected with the anode of the diode D14 to logarithmically expand the voltage D11 and produces a I8' that is equal to the photoelectric current I8. To the base of a transistor D30 is supplied a current of I7'-I8'. The collector of the transistor Q30 is connected to the base of a transistor Q31 which in turn has its collector connected with an AND gate G31 and an inverter IN42. Transistors Q32 and Q33 and resistors R13 and R14 together compose a constant current circuit for generating a constant current I6. Buffer Buf 10 is for inputting the voltage VD10 logarithmically compressed by the diode D13. A resistor R10 and a capacitor C10 smoothes the pulsating current. A comparator COMP11 compares the voltage at the junction J4 and the reference voltage V10.

Explanation will be made about how the circuit detects the contralight condition, i.e. detects that the ratio of brightnesses measured by the average and spotlight measuring elements is larger than a given value. The transistor Q29 is current mirror connected with the transistor Q26 which generates a current equal to the photoelectric current I7 from the average light measuring element SPC20. The emitter of the transistor Q29 is connected between the variable resistor VR1 and the collector of the transistor Q32 which produces a constant current I6. A voltage is generated by the constant current I6 and the variable resistor VR1 so that the emitter-base voltage of the transistor Q29 is smaller than the emitter-base voltage of the transistor Q26. Accordingly, the current I7' supplied from the collector of the transistor Q29 is smaller than the photoelectric current I7. If the voltage generated as monitored above is controlled, the photoelectric current I7 is in a desired relationship with the current I7'. Due to general characteristics of transistors, the base emitter voltage should be dropped by 18 mV (at 25° C.) to halve the output current. In order to make the current I7' a quarter of the photoelectric current I7, i.e. two step lower than the current I7 by APEX system, the variable resistor VR1 and the constant current I6 generates a voltage 18 mT×2×36 mV. In this case, attention should be paid to the fat that the current I7' is also affects the generated voltage. In more detail, the voltage is generated by both currents I6 and I7' running through the variable resistor VR1. This means that the generated voltage depends on the brightness. As the result, the relationship between the current I7' and the photoelectric current I7 can not be actuately controlled. To lessen the effect of the current I7, the amount of the constant current is determined such that I6>>I7' and the value of the variable resistor VR1 is determined to provide the above mentioned voltage. Thus, the current I7' corresponds to a brightness that is lower by a given value (2 EV or 2 steps in the embodiment) than the brightness measured by the average light measuring element SPC20.

The collector of the transistor Q28 receives a current I8' that is equal to the current generated by the partial light measuring element SPC21. A transistor Q30 receives a current corresponding to the difference of I7'-I8'. If I7'≧I8', it is determined that the radio of the brightness of the average light measurement and the brightness of the partial light measurement is equal to or larger than a given value, e.g. 2 EV so that the transistor Q30 receiving the difference current is made conductive to turn off the transistor Q31. Accordingly, the collector of the transistor Q31 is "H" to determine the contralight condition. Thus, the contralight condition is detected, i.e., it is detected that the ratio of the brightness of the average light measurement and the brightness of the partial light measurement is larger than a given value. The comparator COMPl1 determine the low brightness by comparing the reference voltage with the voltage at the junction J4 that is equal to the logarithmically compressed voltage VD10 representative of the brightness of the average light measurement. In the Figure, the signals a, b, c and d are the same as those in FIG. 16.

Figure 23:
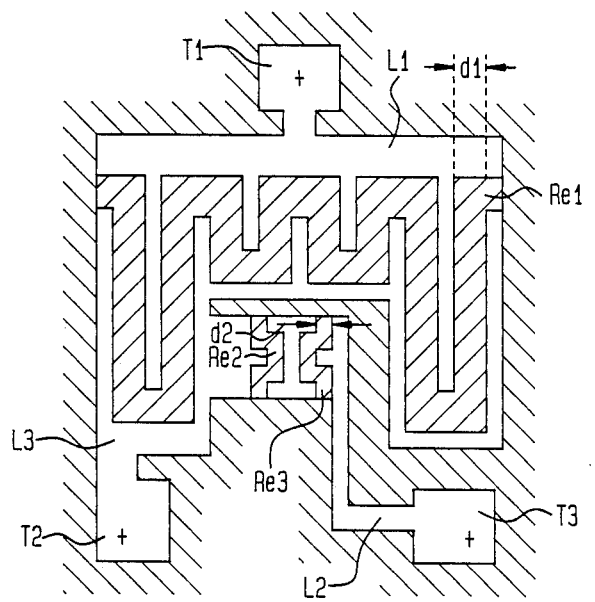
FIG. 23 is an illustration of the pattern of the CdS cell used as the light measuring element.
Figure 24:
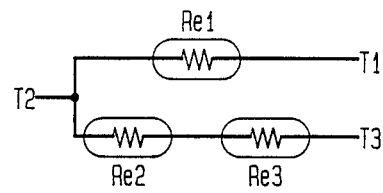
FIG. 24 is a circuit diagram showing the equivalent circuit of the CdS cell shown in FIG. 23.

FIG. 23 shows a pattern of the CdS cell which is used as the light receiving element. FIG. 24 shows the equivalent circuit of the CdS cell with that pattern. With reference to FIG. 23, electrodes are tapped from terminals T1 through T3 to which electrode portions L1 through L3, non-hatched portions in the Figure, are connected. The hatched positions shown CdS portions for the photoelectric convention. The portion hatched by lines drawn in the opposite direction from those of the portion Re1 through Re3 show base plate portions. Re1 is a photoelectric converter portion for average light measurement. The photoelectric element has the following features:

(1) The photoelectric converter CdSs Re2 and Re3 for the partial light measurement is formed on the same base plate or substrate along with the photoelectric converter Re1 for the average light measurement.

(2) The partial light measurement photoelectric converter CdSs Re2 and Re3 are serially connected with each other.

(3) The width d2 of the CdS between electrodes in the Cds portions Re2 and Re3 as the partial light measurement photoelectric converter is narrower than the width d1 of the CdS between the electrodes in the CdS portion Re1 as the average light measurement photoelectric converter. With such a pattern, the connecting portions of electrodes are larger and the number of CdS per unit area are larger in comparison with the case wherein the partial light measuring portion is formed with the width of CdS equal to that d1 for the average light measurement.

Figure 25:
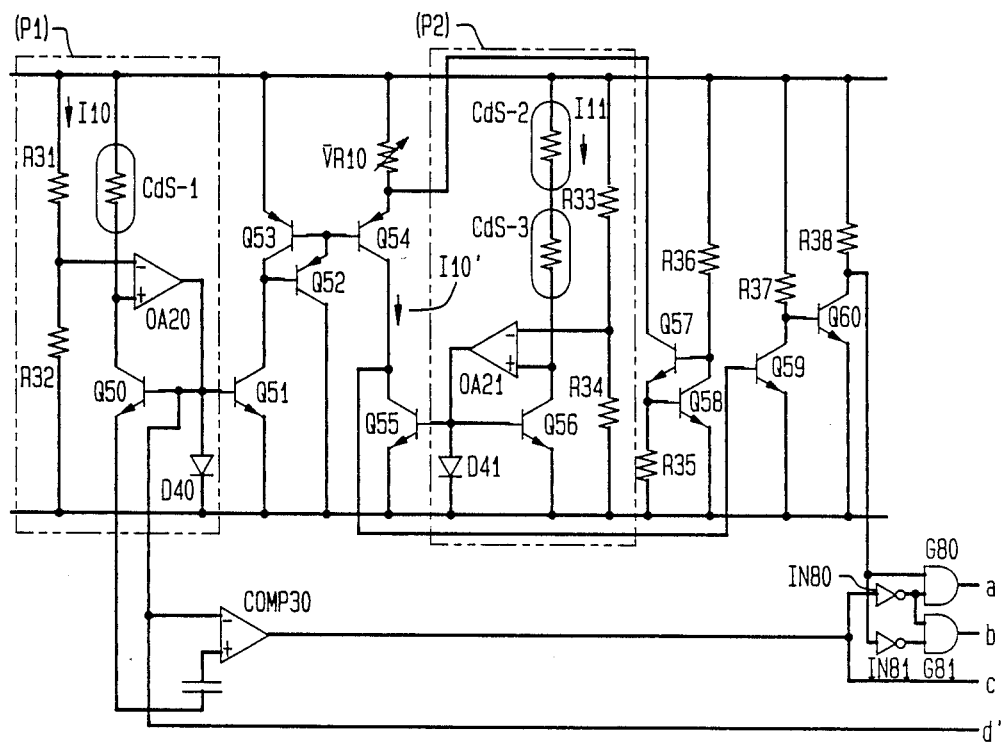
FIGS. 25 and 26 are circuit diagrams showing a second and third modifications of the light measuring circuit shown in FIG. 16.

FIG. 25 shows a second modification of the light measuring circuit block B shown in FIG. 16. In the second modification, the CdS cell shown in FIG. 23 is used as the photoelectric converter. The resistors R31 and R32 is for dividing the power source voltage, and the junction between the resistors R31 and R32 is connected to the inverting input terminal of an operational amplifier OA20. The average light measurement photoelectric converter CdS-1 is connected between the power source and the collector of the transistor Q59. The junction between the photoelectric converter CdS-1 and the collector of the transistor Q59 is connected to the non-inverting input terminal of the operational amplifier OA20. The output of the operational amplifier OA20 is connected to the anode of a diode D40 and to the base of a transistor Q50. The operation of the above described circuit will then be explained. The operational amplifier OA20 and the transistor Q50 work such that the current I10 changes to make the voltage across the resistor R31 equal to the voltage across the photoelectric converter CdS-1. For example, when the brightness of the average light measured portion is low with the resistance of the photoelectric converter element CdS-1 being large, the operational amplifier 20 supplies a small amount of current to the base of the transistor Q50 to lessen the current I10. When the average light measurement portion has a high brightness with the resistance of the photoelectric converter CdS-1 being small, the operational amplifier supplies much current to the base of the transistor Q50 to increase the current I10. A transistor Q51 is current-mirror connected with the transistor Q50 to supply electric current equal to the current I10.

The circuit composed of transistors Q53 and Q54 is to supply to other circuit a current equal to the current I10. A light measuring circuit includes resistors R33 and R34, the serially connected photoelectric converters CdS-2 and CdS-3, an operational amplifier OA21, a transistor Q56 and a diode D41. The light measuring circuit P2 performs an operation that is same as that of the above described light measuring circuit P1. The partial light measurement photoelectric converters CdS-2 and CdS-3 are serially connected with each other so that their combined output is effected by the converter showing larger resistance due to the measurement of lower brightness area. Accordingly, the combined partial light measurement photoconverter mainly measures lower brightness portion. A transistor Q55 is current-mirror connected with the transistor Q56 to provide a current equal to the current I11 which in turn corresponds to the measured brightness. Transistors Q57 and Q58 and resistors R35 and R36 together composes a constant current circuit. The collector of the transistor Q57 is connected to the junction between a variable resistor VR10 and the emitter of the transistor Q54. The purpose of the voltage drop by the variable resistor VR10 and the constant current is the same as that of the voltage drop by the variable resistor VR1. With the voltage drop, the collector current of the transistor Q54 that is current mirror connected with the transistor Q53, is equal to the rest of current I11 which is reduced by a given ratio. The reduction of the current is to detect whether the difference of the brightness of the average and partial light measurements is larger or smaller than a predetermined value. The amount of the voltage drop may be, for example, such as to reduce the value of the brightness of the average light measurement is reduced by two steps, i.e. 2 EV by the APEX system. The current I10' corresponding to the value of the brightness of the average light measurement that is shifted to the under exposure side by two steps, is supplied from the collector of the transistor Q54. The current I11' corresponding to the brightness of the partial light measurement is supplied to the collector of the transistor Q55. If the difference of the currents I10'-I11' is positive, the circuit determines as the contralight condition. A comparator 30 compares the base voltage of the transistor Q50 with a reference voltage to determine a low brightness condition. The other functions are same as those of the circuit shown in FIG. 22 and the signals a, b and c represent the same meanings as those described with reference to FIG. 16. As the present embodiment employs the CdS cell as the photoelectric converter, the signal d' has a difference level from the level of the signal d in FIG. 16, for the same brightness and its amount of change per one step, i.e. 1 EV is also different. Accordingly, it is necessary to change the analog values for the level shift circuit 100 and A/D converter circuit such that the analog values comply with the brightness measured by the CdS cell and its amount of change.

Figure 26:
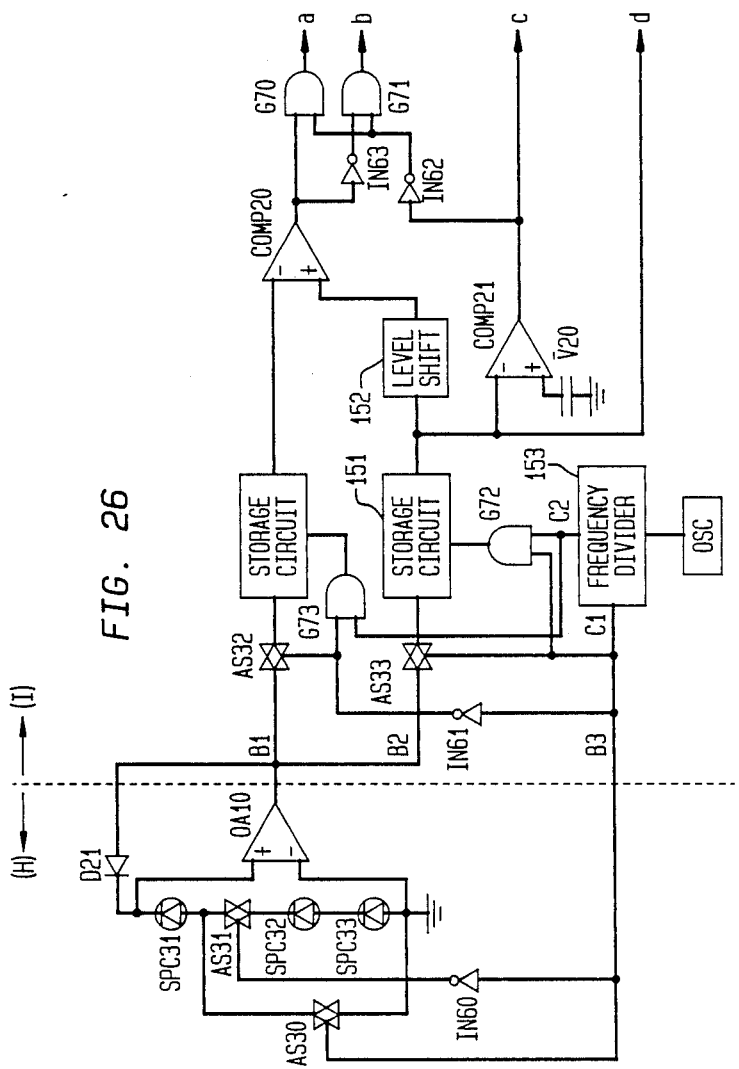
Figure 27:
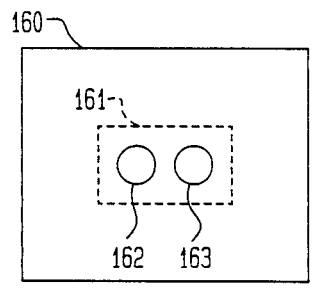
FIG. 27 is an illustration of light measuring area showing an example of the light measuring area of the light receiving element employed in the circuit of FIG. 26.

FIG. 26 shows a third modification of the light measuring circuit shown in FIG. 16. A light receiving element SPC31 is for AE control and light receiving elements SPC32 and SPC33 measure areas within the area measured by the element SPC31. FIG. 27 shows an example of light measuring areas of those light receiving elements SPC31, SPC32 and SPC33.

With reference to FIG. 27, the reference numeral 160 the scene to be photographed, 161 the light measuring area of the light receiving element SPC1, 162 and 163 respectively the light measuring areas of the light receiving elements SPC32 and SPC33.

Returning back to FIG. 26, a diode D21 converts the photoelectric current into a logarithmically compressed voltage. Analog switches AS30 and AS31 selects the light measuring area. Storage circuit store the brightness values of the light measuring area selected as mentioned above. Analog switches AS32 and AS33 selects the storage circuits. A level shift circuit 152 shifts the level of the voltage stored by the storage circuit 151. A comparator COM20 compares the voltage stored in the storage circuit 150 with the voltage shifted by the level shift circuit 152. Another comparator COM21 compares a reference voltage with the voltage stored in the storage circuit. A frequency divider circuit divides the signal fed from the oscillation circuit.

Then, the operation of the circuit is explained. When the release button is depressed by a first stroke to close the power supply switch S1 ad supplies power to the light measuring circuit, the oscillation circuit OSC begins to oscillate. In response to the signals, the frequency divider circuit 153 of which initial condition is "L", outputs a signal Cl that changes between "H" and "L" repeatedly. The other signal C2 becomes "H" a little before the signal Cl changes from "H" to "L" or vice versa. At the initial state, the "L" of the signal C is inverted by an inverter IN60 to "H" to make the analog switch AS31 conductive so that the light receiving elements SPC31, SPC32 and SPC33 are serially connected with each other. With the serial connection of three light receiving elements, the current running into the diode D21 is constrained by the light receiving element that outputs the smallest amount of photoelectric current. In other words, the lowest brightness portion is measured and the output signal represent the brightness of that portion. The signal C1 is inverted by the inverter IN61 to make an analog switch AS32 conductive. With the conduction of the analog switch AS32, the anode voltage of the diode D21 as the logarithmic compression of the photoelectric current is supplied to the storage circuit 150. A little before the signal C1 changes from "L" to "H", the signal C2 becomes "H". In response to the "H" signal, an AND gate G73 outputs an "H" signal which is applied to the storage circuit 150. This signal functions as a storage initiation signal for storing the supplied voltage. When the signal C1 changes from "L" to "H", analog switches AS30 and AS33 become conductive so that only the light receiving element SPCl makes the light measurement. The voltage proportional to the logarithm of the photoelectric current is supplied to the storage circuit 151 through the analog switch AS33. A little before the signal C1 changes from "H" to "L", the signal C2 is generated. In response to the signal C2, an AND gate G72 applies an "H" signal to the storage circuit 151 so that the storage circuit 151 stores the supplied voltage. The voltage stored in the storage circuit 151 is shifted by a level shift circuit 152 by a given amount (in the case of the embodiment 36 mV corresponding to 2 EV) and applied to the non-inventing input terminal of the comparator COMP20. The voltage stored in the storage circuit 150 is applied to the inverting input terminal of the comparator COM20 and is compared with the level shifted voltage. When the output of the comparator COMP20 is "H" to shown that difference of brightness of more than a given value exists, the circuit determines as the contralight condition. The comparator 21 compares the voltage stored in the storage circuit 151 with the reference voltage to determine the low brightness condition. The signals a, b, c and d have the same meanings as the signals a, b, c and d in FIG. 16.

Figure 28:
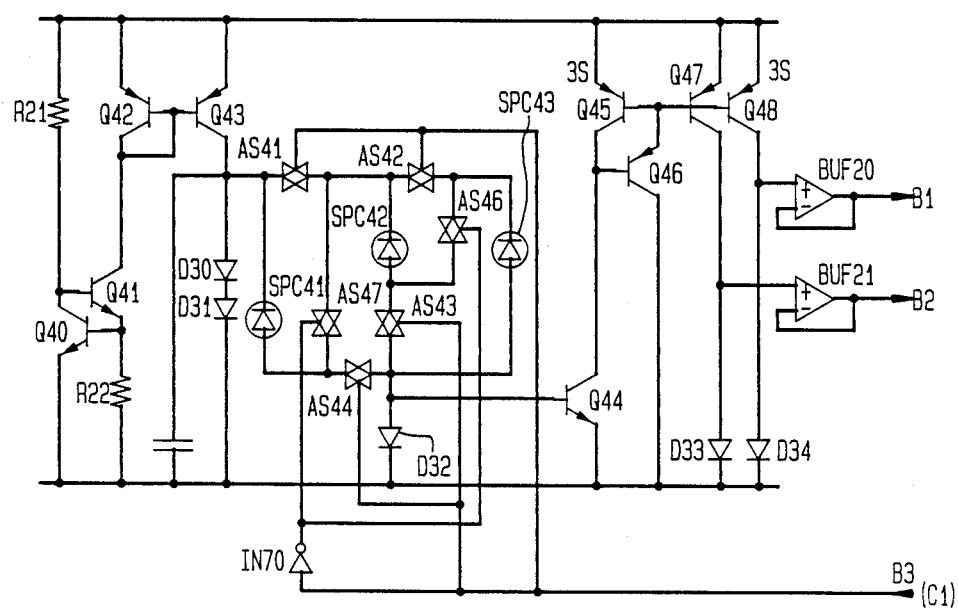
FIG. 28 is a circuit diagram showing a fourth modification of the light measuring circuit shown in FIG. 16.

FIG. 28 shows a fourth modification of the light measuring circuit shown in FIG. 16. In the Figure, the signal lines B1, B2 and B3 are the same as the signal lines B1, a B2 and B3 in FIG. 26. The signal processing after the signal outputs on those lines is the same as is done by the circuit of right side portion of the circuit of FIG. 26 with respect to the broken line. Transistors Q40, Q41, Q42 and Q43 composes a constant current circuit. Diodes D30 and D31 receives the constant current from the collector of the transistor Q43 to supply a stable voltage. Light receiving elements SPC41, SPC42 and SPC43 have light measuring areas such as shown in FIG. 29 as an example.

Figure 29:
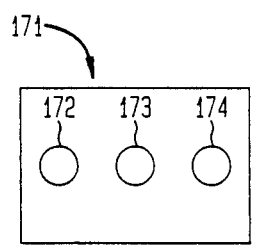
FIG. 29 is an illustration of light measuring area showing an example of the light measuring area of the light measuring element employed in the circuit of FIG. 28.

With reference to FIG. 29, the reference numeral 171 denotes the object scene, 172, 173, 174 denote the light measuring area of the three light receiving elements.

Returning back to FIG. 28, analog switches AS41 through AS47 change the connection of the three light receiving elements between series and parallel ones. Transistor Q44 draws in a current equal to the photoelectric current I10 running into a diode D32. A transistor Q45 represents three transistors and is indicated by a reference indication 3S. The transistor Q45 outputs current I11 equal to the current of transistor Q44, and the base-emitter voltage of the transistor Q45 is the voltage at the time when one third I12 of the current runs therethrough. Transistors Q47 and Q48 are current mirror connected with the transistor Q45. The transistor Q47 supplies the current I12 to the diode D33, white the transistor Q48 supplies to the diode 34 current equal to the current I11 because the Q48 is composed of three transistors. The voltage as the logarithmic compression of those currents are supplied to the storage circuits (see FIG. 26) through buffer Buf20 and Buf21. Then, the operation of the circuit will be explained. When the release button is depressed down by the first stroke to close the power supply switch S1 and supply power to the light measuring circuit, the signal Cl (see FIG. 26) of the initial state is output to the signal line B3. When the signal C1 is inverted by the inverter IN70, the analog switches AS46 and AS47 become conductive so that the light receiving elements SPC41, SPC42 and SPC43 are connected in series with each other. Those connection measure the brightness at the lowest brightness area as explained with reference to FIG. 26. A photoelectric current commensurate with the brightness is supplied to the diode D32. The transistors Q44, Q45 and Q48 supplies to the diode D34 the current equal to the current to the diode D32, with its logarithmically compressed voltage is supplied to the buffer Buf20. When the signal C1 turns from "L" to "H", the analog switches AS41, AS42, AS43 and AS44 conduct to connect the light receiving elements SPC41, SPC42 and SPC43 in parallel with each other. The parallel connection causes all the photoelectric current of the three light receiving elements run into the diode D32. Transistors Q44, Q45 and Q47 supplies the average (⅓) of the current running into the diode D32 and its logarithmically compressed voltage is supplied to the buffer Buf21. The outputs of the buffers Buf20 and Buf21 are respectively entrapped by the storage circuit 150 (see FIG. 26) at the time as described before, and are used for the control.

In the above embodiment shown in FIGS. 20 and 21, the guide number of the strobe is switched in response to the distance signal from the AF circuit. As shown in table 4, the small guide number is selected when a film of ISO100 is used and the main object is in the medium zone from 1.4 m to 2 m. However, in the above described embodiment, if the ambient light is high in the case of the contralight condition and the diaphragm shutter is closed at the small aperture, only a small amount of strobe light contribute to the exposure and insufficient exposure is given to the main object. For example, if a film of ISO100 is used, the brightness of the ambient light is eight by the unit of Bv and the main object is within the zone from 1.4 m to 2 m, the diaphragm aperture and the shutter speed determined by the AE control is F8 and 1/125 second. The suitable diaphragm aperture for the flash photography for the main object at that distance is F3 since the guide number of the strobe is 6. If the shutter is closed at the aperture of F8 by the AE control, exposure is insufficient for the main object by about three steps, i.e. 3 Ev. In consideration with the latitude of a film, the resultant picture will show only the silhouette of the main object with the detail, for example of the expression of the object person being lost. To compensate for this, a larger guide number is used for the photography under the contralight condition. For that purpose, the present embodiment is designed to switch the guide number from 6 to 12 such that about one stop under exposure is given to the main object and the resultant picture will shows the detailed image of the main object, e.g. the face of the object person.

Figure 30:
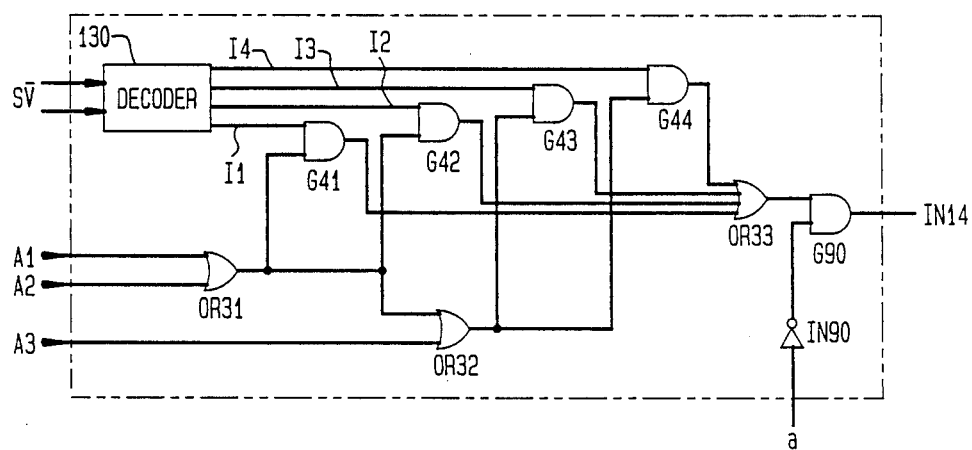
FIG. 30 is a circuit diagram showing a modification of the emitted light amount control circuit shown in FIG. 20.

FIG. 30 shows a modification of the circuit shown in FIG. 20 to attain such an object. The circuit of FIG. 30 receives an "H" signal a representative of the contralight condition, with a circuit added to the circuit of FIG. 20. The "H" signal is inverted by an inverter IN90 and is applied to an AND gate G90 along with the output of the OR gate OR33 as the signal for switching the guide number of the strobe. With this, in the case of the contralight condition, an "L" signal indicating the larger guide number of the flash light is output from the AN gate G90 and the strobe is fired with the larger guide number. In general, when flash photography is made with the exposure, especially the diaphragm aperture given by the AE control, the exposure for the main object will be exposure by AE control plus exposure given by the strobe.

On the other hand, the exposure for the background is given by the AE control. When there is a difference between the brightness of the main object and the brightness of the average light measurement, i.e. the brightness of the background, the strobe light will compensate for the difference to lessen the brightness difference. However, there is a case where the difference of the brightness is too large to be compensated. To lessen the difference of brightness, i.e. the difference of exposure, following measure may be employed, making use of the property of the diaphragm shutter.

Figure 31:
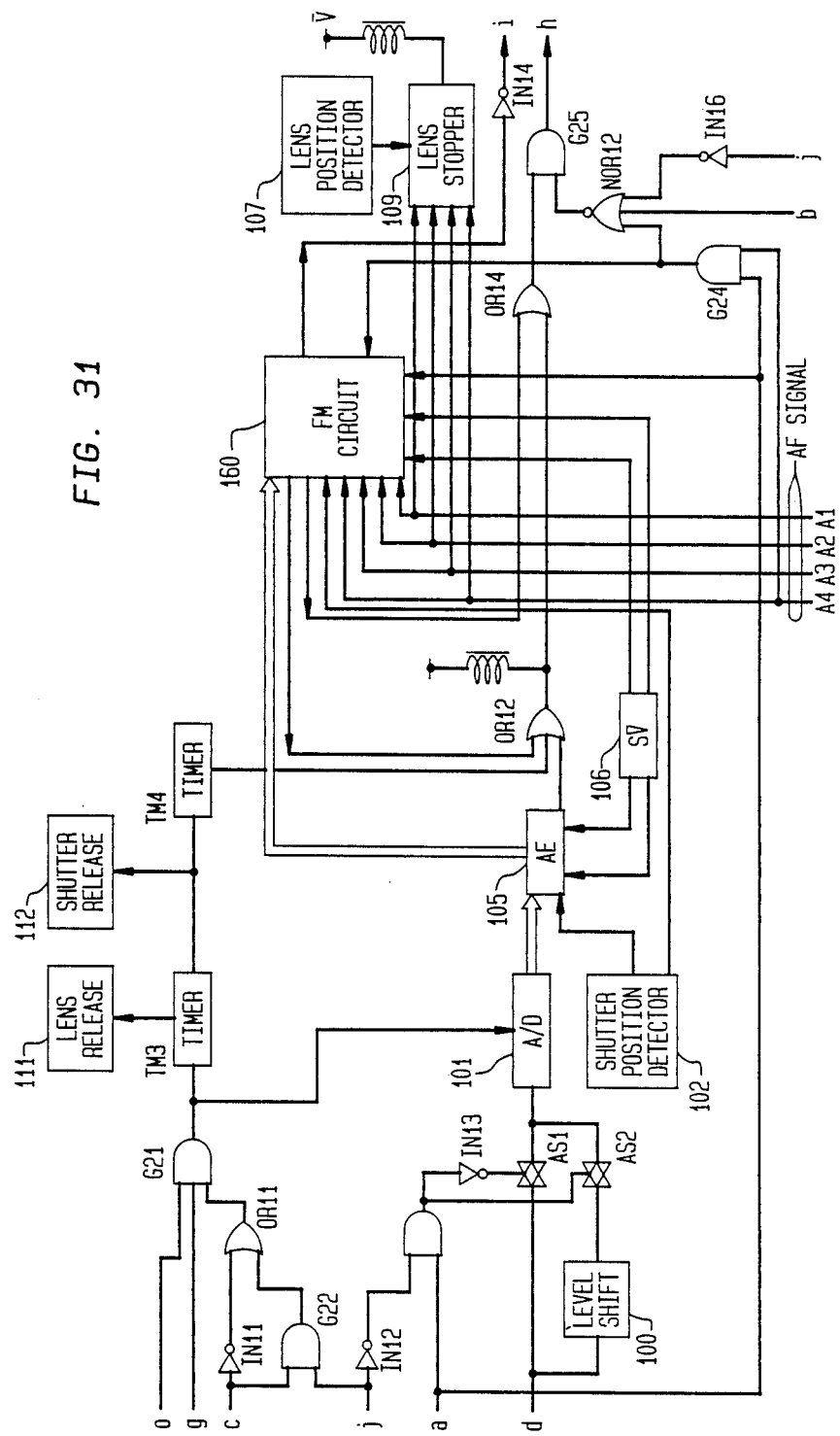
FIG. 31 is a circuit diagram showing a modification of the FM circuit shown in FIG. 21.
Figure 32:
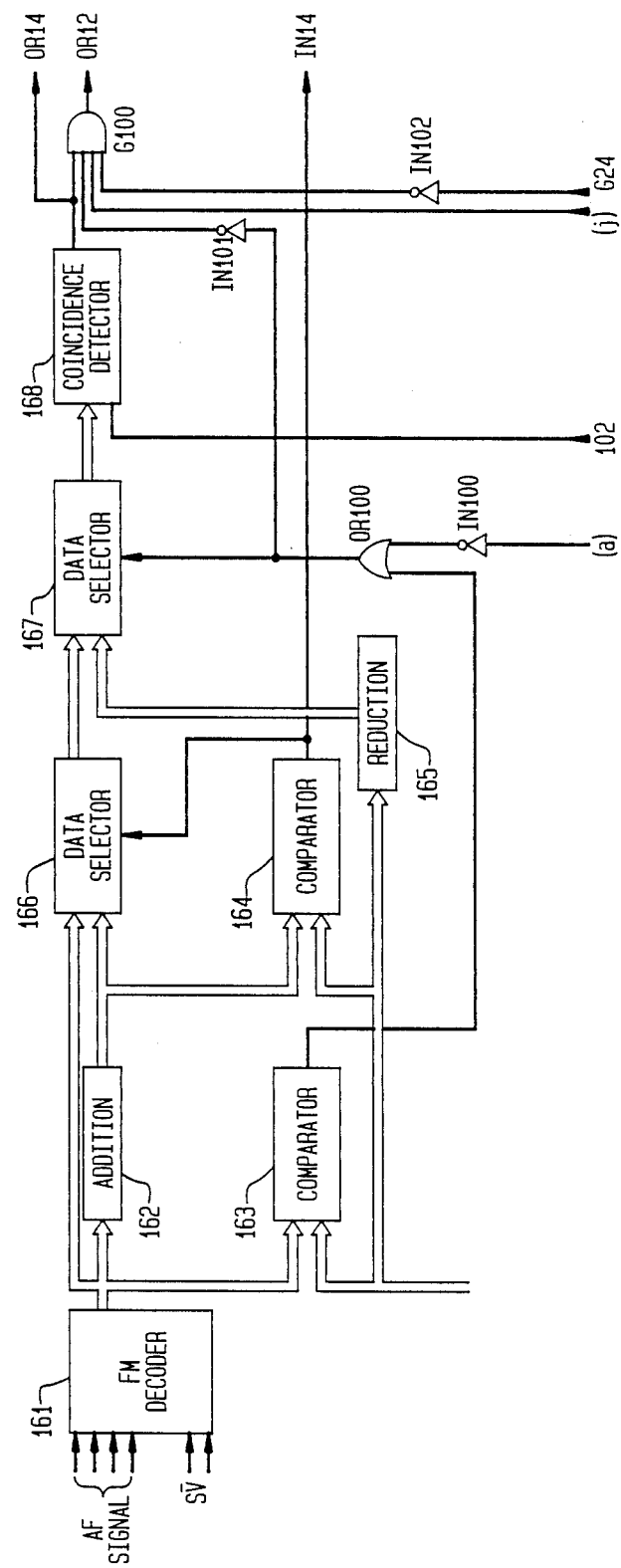
FIG. 32 is a circuit diagram showing a modification of the FM circuit shown in FIG. 21.

When a diaphragm shutter is used, both the diaphragm aperture and the shutter speed change with the change of exposure given by the AE control. In contrast, the exposure for the flash photography is determined only by the diaphragm aperture. Accordingly, if the amount of exposure given by the AE control is shifted by a given value to the underexposure side, the resultant strobe light exposure will be shifted to the underexposure side by an amount corresponding to the change of the diaphragm aperture. Accordingly, the difference of the exposure for the background (exposure of AE control only) which the strobe light do not reach, and the exposure for the main object with the strobe light will be reduced. For example, let's assume that there is a difference of three steps between the brightness of the background (exposure of AE control) and the brightness of the main object, and that the difference of the exposure is made two steps by the flash firing at the diaphragm aperture determined by the AE control. Assume that the diaphragm aperture and the shutter speed change by the same amount in accordance with the change of the exposure determined by the AE control. If the exposure determined by the AE control is shifted to the underexposure side by two steps, the diaphragm aperture is shifted to the underexposure side by one step and the shutter speed is also shifted to the underexposure side by one step. Accordingly, the difference of exposure between the background (AE controlled exposure) and the main object is one step, i.e. 1Ev. FIGS. 31 and 32 show a circuit to attain this function.

FIG. 31 shows a circuit partially modified from the circuit of FIG. 17, with the emitted light control circuit 110 being removed and the FM circuit being modified to have the function of the emitted light control circuit.

FIG. 32 shows a definite circuit of the modified FM circuit 160. An FM decoder 161 receives the AF signal from the AF circuit and the film speed signal from the Sv circuit to select the diaphragm aperture of& the larger guide number and outputs a signal representing the diaphragm aperture. An addition circuit 162 receives the diaphragm aperture indicating signal from the FM decoder 161 and shifts the signal by a given amount to the larger diaphragm aperture side to output to the larger diaphragm aperture side to output a signal representative of a diaphragm aperture for the smaller guide number. Comparators 163 and 164 compare the diaphragm aperture signal from the AE circuit 105 respectively with the diaphragm aperture signal from the FM decoder 161 and the diaphragm aperture signal from the addition circuit 162. A data selector 166 respond to the output of the comparator 164 to select one of the diaphragm aperture signals from the FM decoder 161 and the addition circuit 162 and supplies the selected signal to another data selector 167. A reduction circuit 165 shifts by a given amount to the smaller aperture side, the diaphragm aperture signal for AE control fed from the AE circuit 105 shown in FIG. 31. The data selector 167 responds to the signal from the comparator 163 to select one of the diaphragm aperture signals from the data selector 166 and the addition circuit 165. The selected signal is supplied to the coincidence detecting circuit 168. The coincidence detecting circuit 168 outputs an "H" signal when the diaphragm shutter position signal from the shutter position detecting circuit 102 shown in FIG. 31 coincide with the diaphragm aperture signal from the data selector 167, the shutter position signal changing with the shutter opening.

Then, the operation of the circuit is explained. The FM decoder 161 receives the AF signal from the AF signal and the film speed signal from the SV circuit and selects a diaphragm aperture for providing a suitable exposure with the larger guide number, e.g. 12 in the embodiment. The selected diaphragm aperture signal is applied to the comparator circuit 163 and compared thereby with the AE exposure diaphragm signal from the AE circuit. The other comparator 164 receives and compares the diaphragm aperture signal for AE control fed from the AE circuit, and the diaphragm aperture signal representing the diaphragm aperture value shifted by a given amount to the larger aperture side from the diaphragm aperture selected by the FM decoder 161, i.e. the diaphragm aperture signal representing the diaphragm aperture value for providing a suitable exposure with the smaller guide number of the strobe light. In other words, the comparator circuit 164 determine when the a proper exposure is given for the main object when the strobe is fired with the smaller guide number with the diaphragm aperture being determined by the AE control. When it is determined that a suitable exposure will be provided with the strobe light of the smaller guide number, the output of the comparator 164 is supplied to the inverter IN14. The comparator circuit 163 determines whether the a proper exposure is given for the main object when the strobe is fired with the larger guide number with the diaphragm aperture being determined the AE control. Both comparators output an "H" signal when a suitable exposure is provided for the main object with the diaphragm aperture determined by the AE control with the strobe being fired. The comparators output an "L" signal if the suitable exposure is not expected. Table 5 shows the relationship.

TABLE 5

|  | (1) Suitable exposure with smaller guide number | (2) Suitable exposure with larger guide number | No suitable exposure with any guide number |
| --- | --- | --- | --- |
| Comparator 163 | H | H | L |
| Comparator 164 | H | L | L |

With reference to FIG. 32, the output of the comparator 164 which compares the outputs of the addition circuit 162 and the FM decoder 161, is applied to the data selector 166 which, in response to the applied data, selects one of the diaphragm aperture signals from the FM decoder 161 and the addition circuit 162. In more detail, when a suitable exposure is expected with the strobe light of the smaller guide number, the comparator 164 outputs an "H" signal. The data selector 164, receiving the "H" signal, select the diaphragm aperture signal from the addition circuit and supplies the selected signal to the data selector 167. When a suitable exposure is expected with the strobe light of the larger guide number but is not expected with the strobe light of the smaller guide number, the comparator 164 outputs an "L" signal. The data selector 166, receiving the "L" signal, selects the diaphragm aperture signal from the FM decoder and applies the selected signal to the data selector 167.

When the suitable exposure is not expected even with the strobe light of the larger guide number, an "L" signal representing it is supplied from the comparator 163 to the OR gate OR 100. The other input terminal of the OR gate OR 100 is the signal that the "H" signal for representing the contralight condition is inverted by the inverter 100. Accordingly, the signal is "L" under the contralight condition. Accordingly, the "L" output of the comparator 163 is supplied to the data selector 167 which, in response to the "L" signal, selects the signal of the diaphragm aperture smaller than the diaphragm aperture given by the signal obtained by shifting by a given amount the diaphragm aperture signal for AE exposure output from the reduction circuit 165. The coincidence circuit 168 supplies an "H" signal to the AND gate G100 and the OR gate OR14 (see FIG. 31) when the shutter position indicating signal from the shutter position detecting circuit coincide with the diaphragm aperture signal from the data selector 168. The output of the AND gate G100 is supplied to the OR gate 12 for the control of the AE magnet AEMg.

Thus, in the above embodiment, the exposure of AE control is shifted to the underexposure side and fires the strobe when suitable exposure is not expected for the main object under the contralight condition even if the strobe is fired with the larger guide number. However, this manner of control will cause a problem in the case
  (1) of the contralight condition with the charged voltage of the main capacitor being below)

(2) of the contralight condition with the object distance being infinity. The reason for those is explained with respect to the two cases.

(1) In the case where the main capacitor has not been charged to the given level under contralight condition:

In this case, as the voltage of the main capacitor has not reached the given level, the exposure compensation with the strobe light is not effected for the main object under the contralight condition. Accordingly, the level shift circuit 100 in FIG. 31 shifts to a smaller value the brightness signal from the light measuring circuit (FIG. 16). The AE circuit 105 controls exposure in accordance with the shifted brightness signal so that the exposure value is shifted to the overexposure side in comparison with the case where the exposure is controlled with the not-shifted exposure value. However, under contralight condition, the average light measurement is so large to select the smaller diaphragm aperture so that even the flash light of the larger guide number can not provide sufficient exposure. In addition, when the main object under the contralight condition is at a comparatively larger distance, even the strobe light of the larger guide number can not provide sufficient exposure. As describe above, the above embodiment shift to the underexposure side the exposure signal fed from the AE circuit irrespectively of the charged level of the main capacitor. Thus, the exposure value shifted to the overexposure side due to the incompletion of the charging of the main capacitor, is shifted back to the former value and no contralight compensation is effected.

(2) Large object distance under contralight condition

In this case, as the scene to be photographed is under contralight condition, the brightness value given by the average light measurement is comparatively large to select the smaller diaphragm aperture. In addition, as the object distance is large, the strobe light emission is enforcedly inhibited for the reason that the strobe light, even if being fired, will not contribute to the exposure of the main object. In this case, the exposure signal from the AE circuit 105 is shifted to the underexposure side for the reason that even the strobe light of the larger guide number will not sufficiently reach the main object. However, as the light emission of the strobe is inhibited, compensation for the contralight is not made with only the exposure being shifted to underexposure side only to provide underexposure.

According, the present embodiment is arranged such that the output of the AND gate G100 receives the "L" level change completion signal i representing that the main capacitor has not been charged to the given level, and the output of the inverter IN102 which invert the "H" output of the AND gate G24 of FIG. 31 representing the contralight and at the same far object distance condition. Thus, the FM circuit 108 will not supply the shutter release signal to the OR gate OR12 and the exposure value is not shifted to the underexposure side in the case of above mentioned cases (1) and (2). The shutter is controlled by the output of the AE circuit 105. Further, in the present embodiment, the strobe is fired at the time when diaphragm shutter opens to the smaller one of the apertures determined by the FM control and the AE control. Accordingly, when the FM control determines a smaller aperture than the AE control, a signal is output from the coincidence detecting circuit 168 and supplied through the AND gate G100 to the OR gate OR12 of FIG. 31, and the shutter is closed at that timing so that exposure is insufficient for the background. To avoid this problem the output of the comparator 163 is output to the AND gate G100 through the OR gate OR100 and the inverter IN101 for inverting its output in the case other than the case where the exposure value for the AE control is required to be shifted. Accordingly, in the non-contralight condition, the "L" of the contralight indicating signal is inverted by the inverter IN100. In the case of the contralight condition, the output of the comparator 163 is "H" when a proper exposure is obtained with the AE controlled diaphragm aperture with the strobe being fired at the larger guide number.

Although the embodiments of the present invention has been described, the present invention should not be restricted to the embodiment. For example, although the embodiment outputs an electric signal to the strobe circuit to inhibit the firing of the strobe, a switch for triggering the strobe firing may be provided within the trigger circuit and the switch may be opened in accordance with a strobe light inhibiting signal to inhibit the firing of the strobe.

Although the amount of the strobe light is determined by the selection of a larger and a small capacity capacitors, the amount to emitted light may be changed by charging the duration of the light emission. Although the circuit is arranged for the film speeds of ISO100, 200, 400 and 1000 and the four distance zones of near, medium far and infinity, the number and the range and manner of determination of the film speed and object distance is optical and may be adopted from large variation for the design purpose and the circuit may be arranged in accordance therewith.

As to the light receiving elements in FIGS. 16, 22, 25 and 26, it was assumed that the average light measuring element and the partial light measuring elements produce the same amount of photoelectric current for the same brightness, and only the voltage difference due to the difference of brightness for the consideration of the additional voltage for the determination of brightness difference, voltage drop and the level shift. If the above two kinds of light receiving elements produce different amount of photoelectric current for the same brightness, the additional voltage, voltage drop and the level shift may be compensated for the difference of the output current. Although the determination of low brightness and level shift to the overexposure side are made by the brightness value representing voltage or the Bv of the APEX system, the exposure value for the exposure control taking account of the film speed or Ev(exposure value)=Bv+Sv may be used for that end. In this case, the reference voltage for the comparator that determines the low brightness may be variable in accordance with the film speed.

We claim:

1. An exposure control device for use in a flash photography, comprising:
light measuring means for receiving light from a scene to be photographed and outputting first data representative of the brightness of the relatively small area of the scene and second data representative of the brightness of the relatively large area of the scene;
electric flash means including a flash tube, a capacitor for storing electric energy for firing said flash tube, means for detecting whether a charging of said capacitor has been completed or not, and means for controlling the firing of said flash tube;
contralight detecting means for detecting a contralight condition based on the first and second data;

exposure control means for controlling a camera exposure to a first exposure value; and exposure value correcting means for correcting the first exposure value to generate a second exposure value smaller than the first exposure value;

wherein said exposure control means controls the camera exposure to the first exposure value and said firing control means allows the firing of said flash tube with the charge completion of said capacitor and the contralight condition having been detected, while said exposure control means controls the camera exposure to the second exposure value and said firing control means inhibits the firing of said flash tube with the charge incompletion of said capacitor and the contralight condition being detected.

2. An exposure control device according to claim 1, wherein said light measuring means includes a first plurality of light measuring elements for measuring the brightness of a center portion of the scene and a single second light measuring element for measuring the brightness of the relatively large area of the scene.

3. An exposure control device according to claim 2, wherein the first data of said light measuring means is determined based on the lowest brightness value among the outputs of said first light measuring elements.

4. A contralight detecting device for use in a photography, comprising:

light measuring circuit having a first light measuring means for measuring the brightness of a relatively small area of a scene to be photographed to generate first data and a second light measuring means for measuring the brightness of a relatively large area of the scene to generate second data; and means for detecting a contralight condition based on the first and he second data;

wherein said first light measuring means includes a plurality of light receiving elements and the first data is determined based on the lowest brightness value among the outputs of said plurality of light receiving elements.

5. A contralight detecting device according to claim 4, wherein said plurality of light receiving elements are displaced at predetermined intervals respectively.

6. A contralight detecting device according to claim 5, wherein said plurality of light receiving elements are arranged to measure the portion of the scene shifted down from the center line with respect to a vertical direction.

7. A contralight detecting device according to claim 4, wherein said first light measuring means is arranged to measure the center portion of the scene.

8. A contralight detecting means for use in a photography, comprising:

a light measuring means having a first light measuring element for measuring the brightness of a relatively small area of a scene to be photographed to generate first data and a second light measuring element for measuring the brightness of a relatively large area of the scene to generate second data; and means for detecting a contralight condition based on the first and the second data;

wherein said first light measuring element is arranged to measure a portion of the scene shifted down from the center line of the scene with respect to a vertical direction, and said second light receiving means is arranged to measure the portion of the scene surrounding that of said first measuring means.

9. A contralight detecting device according to claim 8, wherein said first light measuring element includes a plurality of elements.

* * * * *